US012071500B2

(12) United States Patent
Fujiwara

(10) Patent No.: US 12,071,500 B2
(45) Date of Patent: Aug. 27, 2024

(54) RESIN COMPOSITION, ADHESIVE MEMBER, AND DISPLAY DEVICE INCLUDING THE SAME

(71) Applicant: Samsung Display Co., Ltd., Yongin-si (KR)

(72) Inventor: Tetsuya Fujiwara, Yokohama (JP)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 280 days.

(21) Appl. No.: 17/383,772

(22) Filed: Jul. 23, 2021

(65) Prior Publication Data

US 2022/0177626 A1 Jun. 9, 2022

(30) Foreign Application Priority Data

Dec. 9, 2020 (KR) .................. 10-2020-0171104

(51) Int. Cl.
*C08F 255/10* (2006.01)
*C08F 2/50* (2006.01)
*C09J 4/06* (2006.01)
*G02F 1/1333* (2006.01)

(52) U.S. Cl.
CPC ............. *C08F 255/10* (2013.01); *C08F 2/50* (2013.01); *C09J 4/06* (2013.01); *G02F 1/133311* (2021.01); *C09K 2323/05* (2020.08); *C09K 2323/057* (2020.08); *C09K 2323/059* (2020.08); *G02F 2202/28* (2013.01)

(58) Field of Classification Search
None
See application file for complete search history.

(56) References Cited

U.S. PATENT DOCUMENTS

| 2009/0081452 | A1* | 3/2009 | Husemann | ................ B32B 7/12 |
| | | | | 156/247 |
| 2011/0014410 | A1* | 1/2011 | Kishioka | .................... C09J 7/10 |
| | | | | 428/41.8 |
| 2014/0329927 | A1* | 11/2014 | Ha | .............................. C09J 4/00 |
| | | | | 522/42 |
| 2015/0050509 | A1 | 2/2015 | Yoshida et al. | |
| 2016/0212840 | A1* | 7/2016 | Koo | ....................... G06F 1/1626 |
| 2018/0051197 | A1* | 2/2018 | Wu | ....................... C09D 175/16 |

(Continued)

FOREIGN PATENT DOCUMENTS

| JP | 5826639 | 12/2015 |
| JP | 2017-95659 | 6/2017 |
| JP | 2017-210578 | 11/2017 |

(Continued)

*Primary Examiner* — Anthony J Frost
(74) *Attorney, Agent, or Firm* — KILE PARK REED & HOUTTEMAN PLLC

(57) ABSTRACT

A resin composition may include a (meth)acrylate (A) comprising a hydroxy group and having a molecular weight of about 500 or less, and a polymer (B) comprising polyisoprene or polybutadiene as a main skeleton, having at least one radical reactive group in one molecule, and having a molecular weight in a range of about 2,000 to about 35,000, wherein the resin composition has a glass transition temperature in a range of about −50° C. to about 0° C. after the resin composition is cured, and the resin composition has a viscosity in a range of about 5 mPa·s to about 50 mPa·s at a temperature in a range of about 30° C. to about 50° C.

14 Claims, 10 Drawing Sheets

(56) References Cited

U.S. PATENT DOCUMENTS

2018/0112106 A1    4/2018  Yeon et al.

FOREIGN PATENT DOCUMENTS

| | | | |
|---|---|---|---|
| JP | 2017210578 A | * 11/2017 | ................ C08F 2/50 |
| JP | 2018-45213 | 3/2018 | |
| JP | 2018-514602 | 6/2018 | |
| JP | 2019-61323 | 4/2019 | |
| JP | 6523098 | 5/2019 | |
| JP | 2019-89975 | 6/2019 | |
| JP | 2019-99714 | 6/2019 | |
| JP | 6576012 | 9/2019 | |
| JP | 2020-147643 | 9/2020 | |
| KR | 10-1138798 | 4/2012 | |
| KR | 10-2017-0032529 | 3/2017 | |
| WO | 2013/141314 | 9/2013 | |
| WO | 2016/150821 | 9/2016 | |
| WO | 2017/047889 | 3/2017 | |
| WO | 2017/203783 | 11/2017 | |

* cited by examiner

RESIN COMPOSITION, ADHESIVE MEMBER, AND DISPLAY DEVICE INCLUDING THE SAME

CROSS-REFERENCE TO RELATED APPLICATION(S)

This application claims priority to and benefits of Korean Patent Application No. 10-2020-0171104 under 35 U.S.C. § 119, filed on Dec. 9, 2020 in the Korean intellectual Property Office, the entire contents of which are incorporated herein by reference.

BACKGROUND

1. Technical Field

The disclosure herein relates to a resin composition, an adhesive member formed from the resin composition, and a display device including the adhesive member.

2. Description of the Related Art

Various types of display devices used for multimedia devices such as a television set, a mobile phone, a tablet computer, a navigation system, and a game console are being developed. Recently, display devices which are foldable, bendable, or rollable using flexible display members that are bendable are being under development to enable ease of portability and increase user friendliness.

Respective members used in such flexible display devices are required to secure reliability in the act of folding or bending. Adhesive resins used to form an adhesive layer applied to various types of display devices need to have excellent coating properties for the members of the various types of display devices.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a resin composition having excellent coating properties and exhibiting a low glass transition temperature after being cured, and an adhesive member prepared therefrom.

The disclosure also provides a display device having excellent durability and stability at high and low temperatures, and having excellent reliability in an operation state such as folding by including an adhesive member having a high flexural adhesiveness.

An embodiment provides a resin composition that may include a (meth)acrylate (A) comprising a hydroxy group and having a molecular weight of about 500 or less; and a polymer (B) comprising polyisoprene or polybutadiene as a main skeleton, having at least one radical reactive group in one molecule, and having a molecular weight in a range of about 2,000 to about 35,000, wherein the resin composition may have a glass transition temperature in a range of about −50° C. to about 0° C. after the resin composition is cured, and the resin composition may have a viscosity in a range of about 5 mPa·s to about 50 mPa·s at a temperature in a range of about 30° C. to about 50° C.

In an embodiment, the resin composition may further include a monofunctional (meth) acrylate (C) different from the (meth) acrylate (A).

In an embodiment, with respect to a total amount of the resin composition, the resin composition may contain the (meth)acrylate (A) in an amount in a range of about 5 wt % to about 30 wt %, the polymer (B) in an amount in a range of about 0.1 wt % to about 5 wt %, and the monofunctional (meth)acrylate (C) in an amount in a range of about 50 wt % to about 88 wt %.

In an embodiment, at least one of the (meth)acrylate (A), the polymer (B), and the monofunctional (meth)acrylate (C) may have two or more types.

In an embodiment, the resin composition may further include a urethane (meth)acrylate oligomer (D) having a molecular weight of about 6,000 or greater.

In an embodiment, the resin composition may contain the urethane (meth)acrylate oligomer (D) in an amount in a range of about 1 wt % to about 15 wt % with respect to a total amount of the resin composition.

In an embodiment, the resin composition may have a 180° peel strength of about 1000 gf/25 mm or greater for a polyethylene terephthalate (PET) film and glass, after the resin composition is cured.

In an embodiment, the resin composition may further include at least one radical polymerization initiator.

In an embodiment, the resin composition may include an organic solvent, wherein the organic solvent may be contained in an amount of about 1 wt % or less with respect to a total amount of the resin composition.

In an embodiment, an adhesive member may include a polymer derived from a resin composition, the adhesive member having a glass transition temperature in a range of about −50° C. to about 0° C., wherein the resin composition may include a (meth)acrylate (A) containing a hydroxy group and having a molecular weight of about 500 or less; and a polymer (B) having polyisoprene or polybutadiene as a main skeleton, having at least one radical reactive group in one molecule, and having a molecular weight in a range of about 2,000 to about 35,000, the resin composition having a viscosity in a range of about 5 mPa·s to about 50 mPa·s at a temperature in a range of about 20° C. to about 30° C.

In an embodiment, the polymer may be formed by photocuring the resin composition.

In an embodiment, the resin composition may further comprise a monofunctional (meth)acrylate (C) different from the (meth)acrylate (A) and the polymer (B), and the resin composition comprises, with respect to a total amount of the resin composition the (meth)acrylate (A) in an amount in a range of about 5 wt % to about 30 wt %; the polymer (B) in an amount in a range of about 0.1 wt % to about 5 wt %; the monofunctional (meth)acrylate (C) in an amount in a range of about 50 wt % to about 88 wt %.

In an embodiment, the resin composition may further comprise a urethane (meth)acrylate oligomer (D) in an amount in a range of about 1 wt % to about 15 wt % with respect to a total amount of the resin composition, the urethane (meth)acrylate oligomer (D) having a molecular weight of about 6,000 or greater.

In an embodiment, a display device may include a display panel; a window disposed on the display panel; and an adhesive member disposed between the display panel and the window, wherein the adhesive member has a glass transition temperature in a range of about −50° C. to about 0° C., and is derived from a resin composition that may include a (meth)acrylate (A) containing a hydroxy group and having a molecular weight of about 500 or less; and a polymer (B) having polyisoprene or polybutadiene as a main skeleton, having at least one radical reactive group in one molecule, and having a molecular weight in a range of about 2,000 to about 35,000, and that has a viscosity of about 5 mPa·s to about 50 mPa·s at a temperature in a range of about 20° C. to about 30° C.

In an embodiment, the adhesive member may have a thickness in a range of about 50 μm to about 200 μm.

In an embodiment, the display device may further include an input sensing unit disposed on the display panel, wherein the adhesive member may be disposed between the display panel and the input sensing unit or disposed between the input sensing unit and the window.

In an embodiment, the display panel may include a display element layer and an encapsulation layer disposed on the display element layer; the input sensing unit may be disposed on the encapsulation layer; and the adhesive member may be disposed on the input sensing unit.

In an embodiment, the adhesive member may be formed by disposing the resin composition on a surface of the window or on a surface of the display panel, and UV curing the resin composition.

In an embodiment, the display device may further include at least one folding area, wherein the at least one folding area may have a radius of curvature of about 5 mm or less.

In an embodiment, the display device may further include a light control layer disposed between the adhesive member and the window; and an optical adhesive layer disposed between the light control layer and the window, wherein the optical adhesive layer may include a polymer derived from the resin composition.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain principles of the disclosure. In the drawings.

DETAILED DESCRIPTION OF THE EMBODIMENTS

Figure 1:
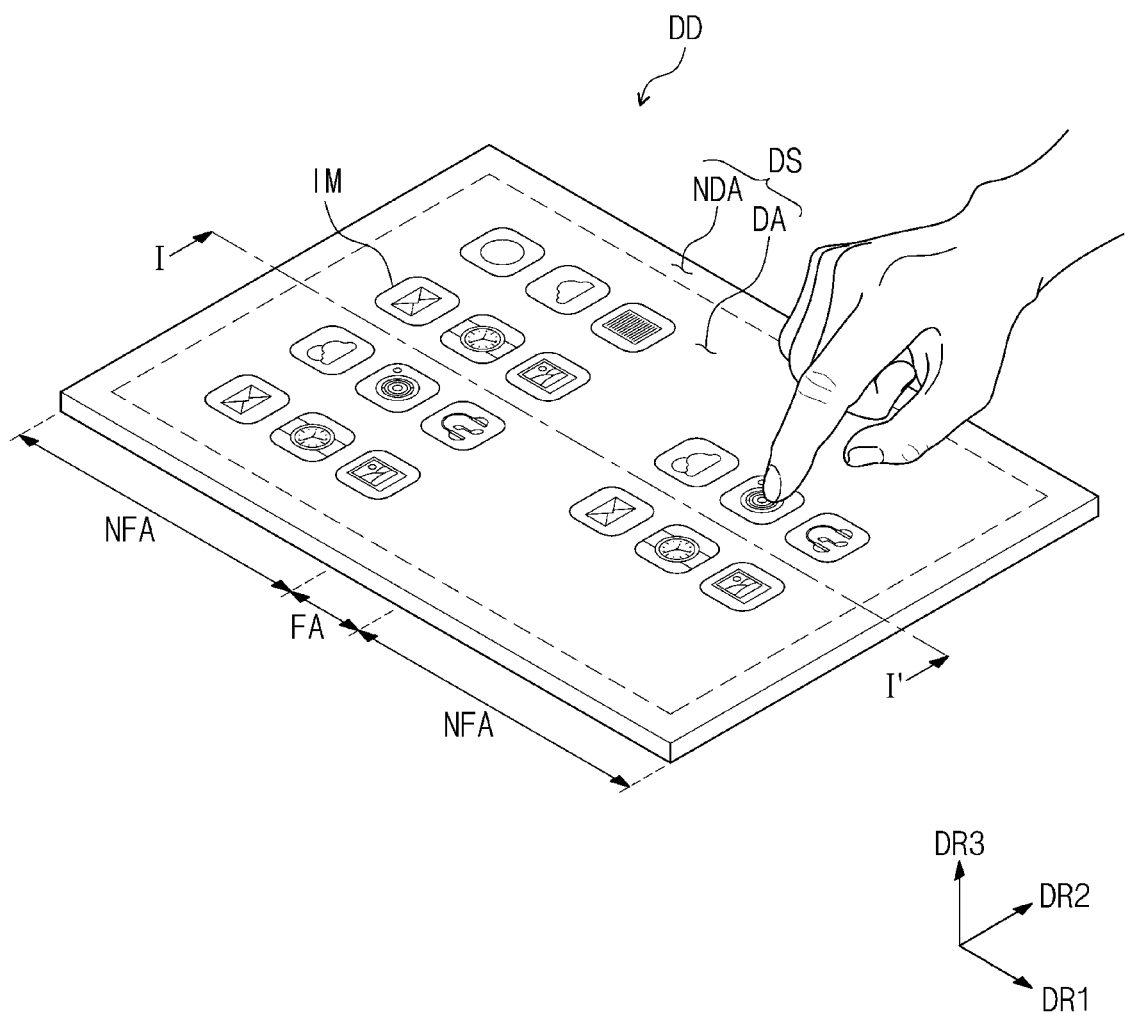
FIG. 1 is a perspective view of a display device according to an embodiment.

The disclosure may be modified in many alternate forms, and thus embodiments will be described in the drawings and described in detail. It should be understood, however, that it is not intended to limit the disclosure to the forms disclosed, but rather, is intended to cover all modifications, equivalents, and alternatives falling within the spirit and scope of the disclosure.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

In the description, when an element (or a region, a layer, a portion, etc.) is referred to as being "on," "connected to," or "coupled to" another element, it means that the element may be directly disposed on/connected to/coupled to the other element, or that a third element may be disposed therebetween.

In the description, "directly disposed" may indicate that there is no layer, film, region, plate or the like added between a portion of a layer, a film, a region, a plate or the like and other portions. For example, "directly disposed" may indicate disposing without additional members such as an adhesive member between two layers or two members.

Like reference numerals refer to like elements. Also, in the drawings, the thickness, the ratio, and the dimensions of elements may be exaggerated for an effective description of technical contents.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of example embodiments. The terms of a singular form may include plural forms unless the context clearly indicates otherwise.

In addition, terms such as "below," "lower," "above," "upper," and the like are used to describe the relationship of the configurations shown in the drawings. The terms are used as a relative concept and are described with reference to the direction indicated in the drawings. In the description, it should be understood that when an element is referred to as "disposed on", it may be as disposed "above" or "under" the other element.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The phrase "in a plan view" means viewing the object from the top, and the phrase "in a schematic cross-sectional view" means viewing a cross-section of which the object is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the disclosure pertains. It is also to be understood that terms defined in commonly used dictionaries should be interpreted as having meanings consistent with the meanings in the context of the relevant art, and will not be interpreted in an idealized or overly formal sense unless expressly so defined herein.

It should be understood that the terms "comprises," "comprising," "includes," and/or "including,", "has," "have," and/or "having," and variations thereof are intended to specify the presence of stated features, integers, steps, operations, elements, components, or combinations thereof in the disclosure, but do not preclude the presence or addition of one or more other features, integers, steps, operations, elements, components, or combinations thereof.

Hereinafter, a resin composition, an adhesive member, and a display device according to an embodiment will be described with reference to the accompanying drawings.

Figure 2:
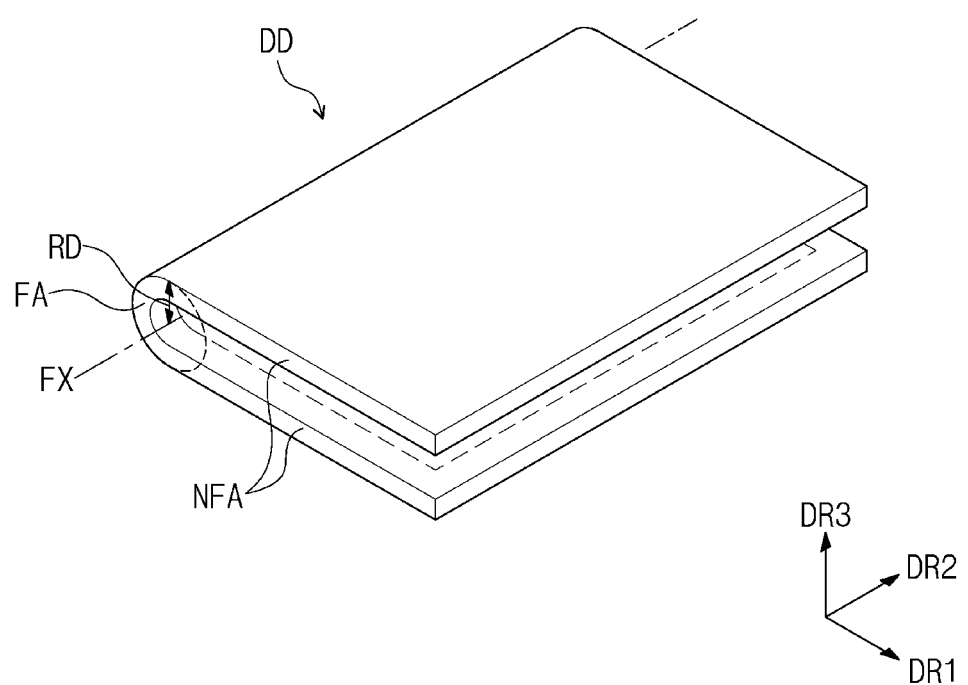
FIG. 2 is a view illustrating the display device shown in FIG. 1 in a folded state.

FIG. 1 is a perspective view of a display device according to an embodiment. FIG. 2 is a view illustrating the display device shown in FIG. 1 in a folded state.

Referring to FIG. 1, a display device DD according to an embodiment may have a substantially rectangular shape having long sides extending in a first direction DR1 and short sides extending in a second direction DR2 crossing or intersecting the first direction DR1. However, an embodiment is not limited thereto. The display device DD may have various shapes such as substantially circular and substantially polygonal shapes. The display device DD may be a flexible display device.

In the display device DD according to an embodiment, a display surface DS on which an image IM is displayed may be parallel to a plane defined by the first direction DR1 and the second direction DR2. A normal direction of the display surface DS, for example, a thickness direction of the display device DD is indicated by a third direction DR3. A front surface (or an upper surface) and a rear surface (or a lower surface) of respective members may be defined by the third direction DR3. However, the directions indicated by the first to third directions DR1, DR2, and DR3 are relative concepts, and may thus be changed to other directions.

The display device DD of an embodiment may include at least one folding area FA. Referring to FIGS. 1 and 2, the display device DD may include the folding area FA and non-folding areas NFA. The folding area FA may be disposed between the non-folding areas NFA, and the folding area FA and the non-folding areas NFA may be arranged or disposed adjacent to each other in the first direction DR1.

The folding area FA may be a portion deformable into a shape which is folded with respect to a folding axis FX extending in the second direction DR2, which is one direction or a direction. The folding area FA may have a radius of curvature RD of about 5 mm or less.

FIGS. 1 and 2, as an example, illustrate one folding area FA and two non-folding areas NFA, but the numbers of the folding area FA and the non-folding areas NFA are not limited thereto. For example, the display device DD may include non-folding areas NFA which may be more than two, and folding areas FA disposed between the non-folding areas NFA.

In the display device DD of an embodiment, the non-folding areas NFA may be disposed to be symmetrical to each other with respect to the folding area FA. However, an embodiment is not limited thereto, and the folding area FA may be disposed between the non-folding areas NFA, but the areas of two non-folding areas NFA facing each other with respect to the folding area FA may be different.

A display surface DS of the display device DD may include a display area DA and a non-display area NDA around the display area DA. The display area DA may display images, and the non-display area NDA may not display images. The non-display area NDA may surround or may be adjacent to the display area DA, and define an edge of the display device DD.

Referring to FIG. 2, the display device DD may be a foldable display device DD which may be folded or unfolded. For example, the folding area FA may be folded along the folding axis FX which may be parallel to the second direction DR2, so that the display device DD may be folded. The folding axis FX may be defined as a minor axis parallel to the short sides of the display device DD.

In case that the display device DD is folded, the non-folding areas NFA may face each other, and the display device DD may be in-folded such that the display surface DS may not be exposed to the outside. However, an embodiment is not limited thereto. Unlike the one illustrated in the drawing, the display device DD may be out-folded such that the display surface DS may be exposed to the outside.

Figure 3:
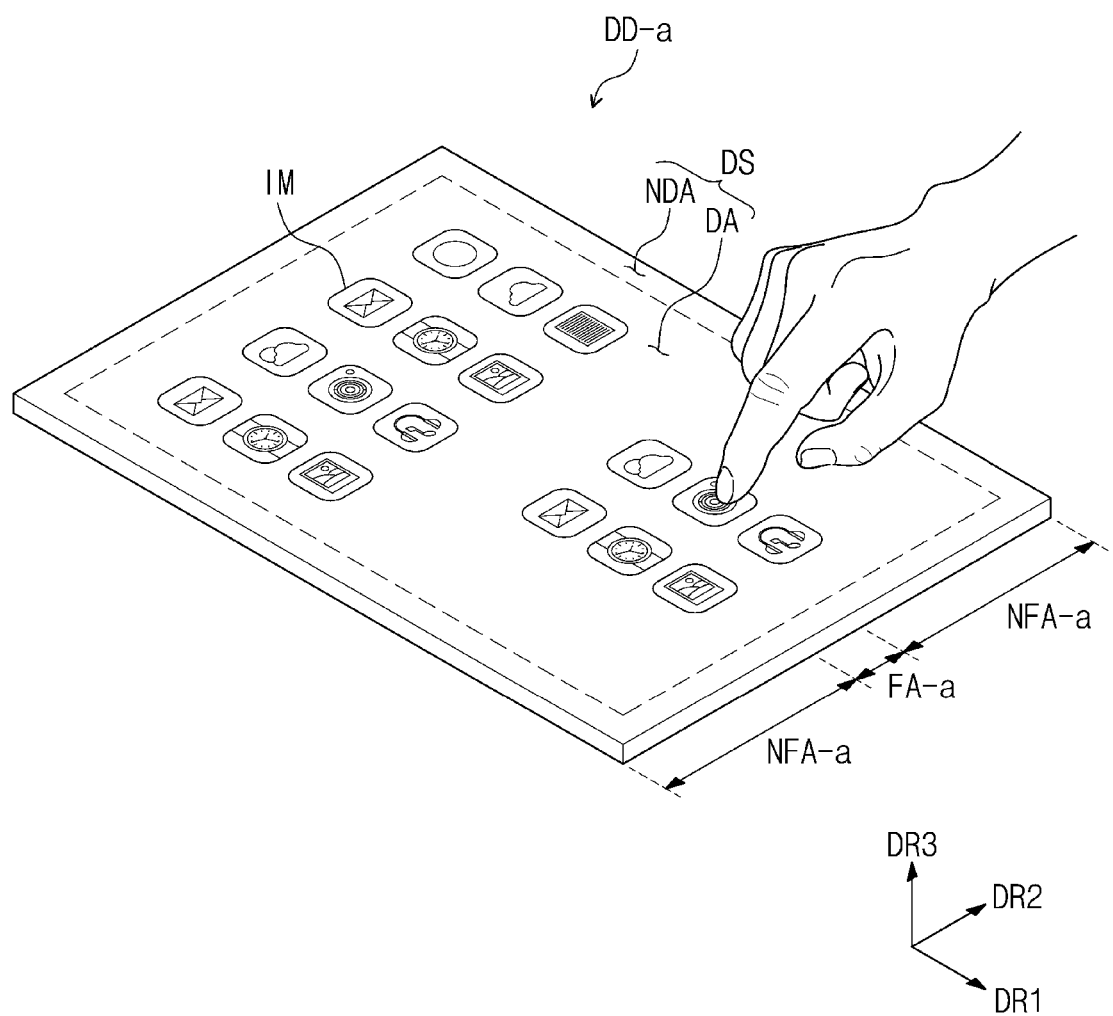
FIG. 3 is a perspective view of a display device according to an embodiment.
Figure 4:
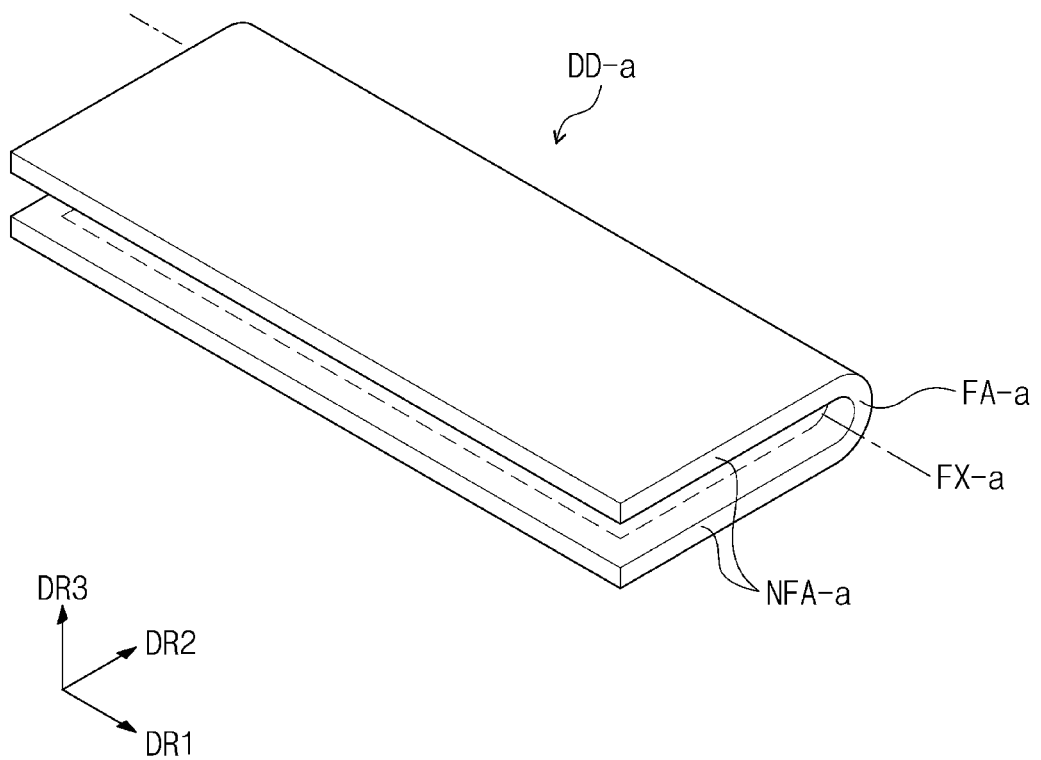
FIG. 4 is a view illustrating the display device shown in FIG. 3 in a folded state.

FIG. 3 is a perspective view of a display device according to an embodiment. FIG. 4 is a view illustrating the display device shown in FIG. 3 in a folded state.

Except for the folding action, a display device DD-a illustrated in FIG. 3 may have a substantially identical configuration or structure as that of the display device DD illustrated in FIG. 1. Accordingly, for descriptions on the display device DD-a illustrated in FIGS. 3 and 4, the folding action will be described.

Referring to FIGS. 3 and 4, the display device DD-a may include a folding area FA-a and non-folding areas NFA-a. The folding area FA-a may be disposed between the non-folding areas NFA-a, and the folding area FA-a and the non-folding areas NFA-a may be arranged or disposed adjacent to one another in the second direction DR2.

The folding area FA-a may be bent with respect to a folding axis FX-a which may be parallel to the first direction DR1, and the display device DD-a may thus be folded. The folding axis FX-a may be defined as a major axis parallel to the long sides of the display device DD-a. The display device DD illustrated in FIG. 1 may be folded with respect to the minor axis, whereas the display device DD-a illustrated in FIG. 3 may be folded with respect to the major axis. FIG. 4 illustrates that the display device DD-a is in-folded such that the display surface DS is not exposed to the outside, but an embodiment is not limited thereto, and the display device DD-a may be folded with respect to the major axis and out-folded.

Figure 5:
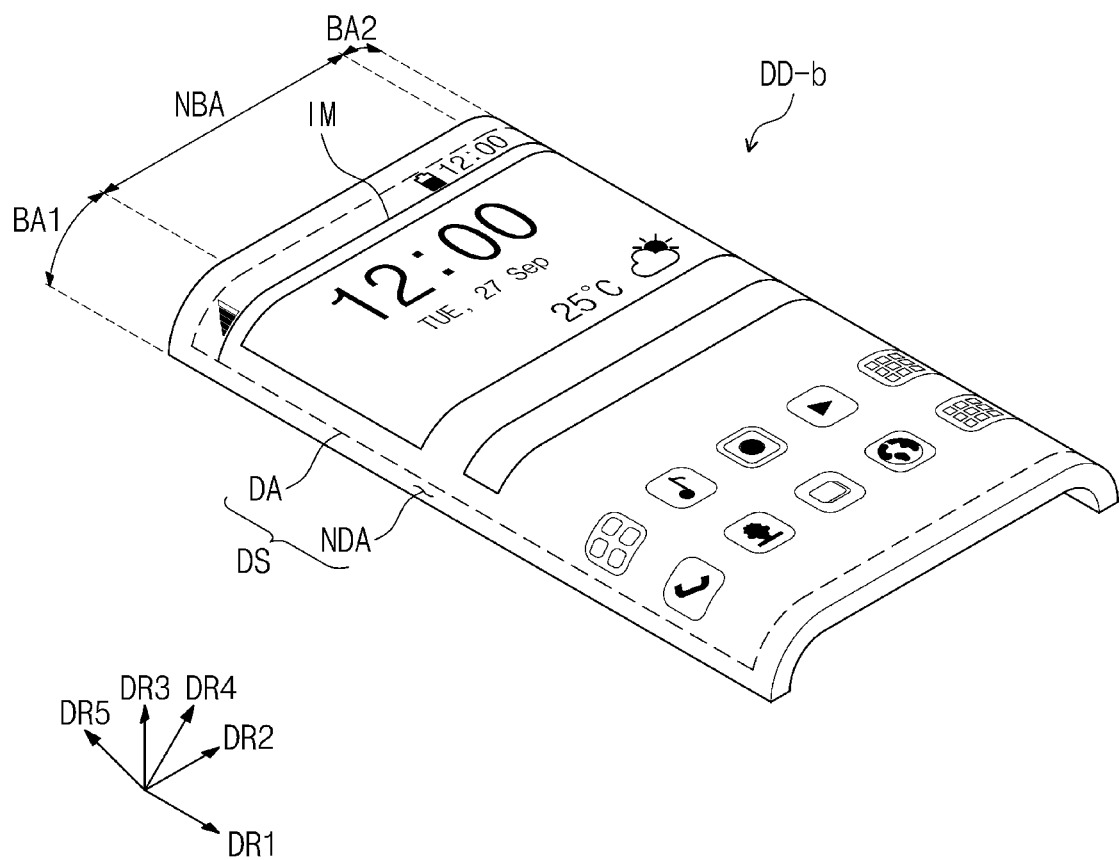
FIG. 5 is a perspective view of a display device according to an embodiment.

FIG. 5 is a perspective view of a display device according to an embodiment. A display device DD-b of an embodiment may include first and second bending areas BA1 and BA2 and a non-bending area NBA, and the first and second bending areas BA1 and BA2 may be bent from one side or a side of the non-bending area NBA.

Referring to FIG. 5, the display device DD-b of an embodiment may include the non-bending area NBA displaying the image IM on a front surface, and the first bending area BA1 and the second bending area BA2 which are displaying the image IM on a side surface. The first bending area BA1 and the second bending area BA2 may each be bent from both sides of the non-bending area NBA.

Referring to FIG. 5, the non-bending area NBA may provide the image IM in a direction of the third direction DR3 which may be the front surface of the display device DD-b, and the first bending area BA1 and the second bending area BA2 may provide images in directions of a fifth direction DR5 and a fourth direction DR4, respectively. The fourth direction DR4 and the fifth direction DR5 may be crossing or intersecting the first to third directions DR1, DR2, and DR3. However, the directions indicated by the first to fifth directions DR1 to DR5 are relative concepts, and are not limited to the relationships as illustrated in the drawings.

The display device DD-b of an embodiment may be a bending display device including a non-bending area NBA, and first and second bending areas BA1 and BA2 each disposed on both sides of the non-bending area NBA. Although not illustrated, the display device of an embodiment may be a bending display device including one non-bending area and one bending area. The bending area may be bent only at one side or a side of the non-bending area.

FIGS. 1 to 5 described above illustrate a foldable display device, a bending display device, for example, but an embodiment is not limited thereto. The display device of an embodiment may be a rollable display device, a flat rigid display device, or a curved rigid display device.

Hereinafter, a display device of an embodiment will be described based on the display device DD which is folded with respect to the minor axis, but an embodiment is not limited thereto, and the following descriptions may be applied to various types of display devices in addition to the display device DD-a which is folded with respect to the major axis and the display device DD-b including a bending area.

Figure 6:
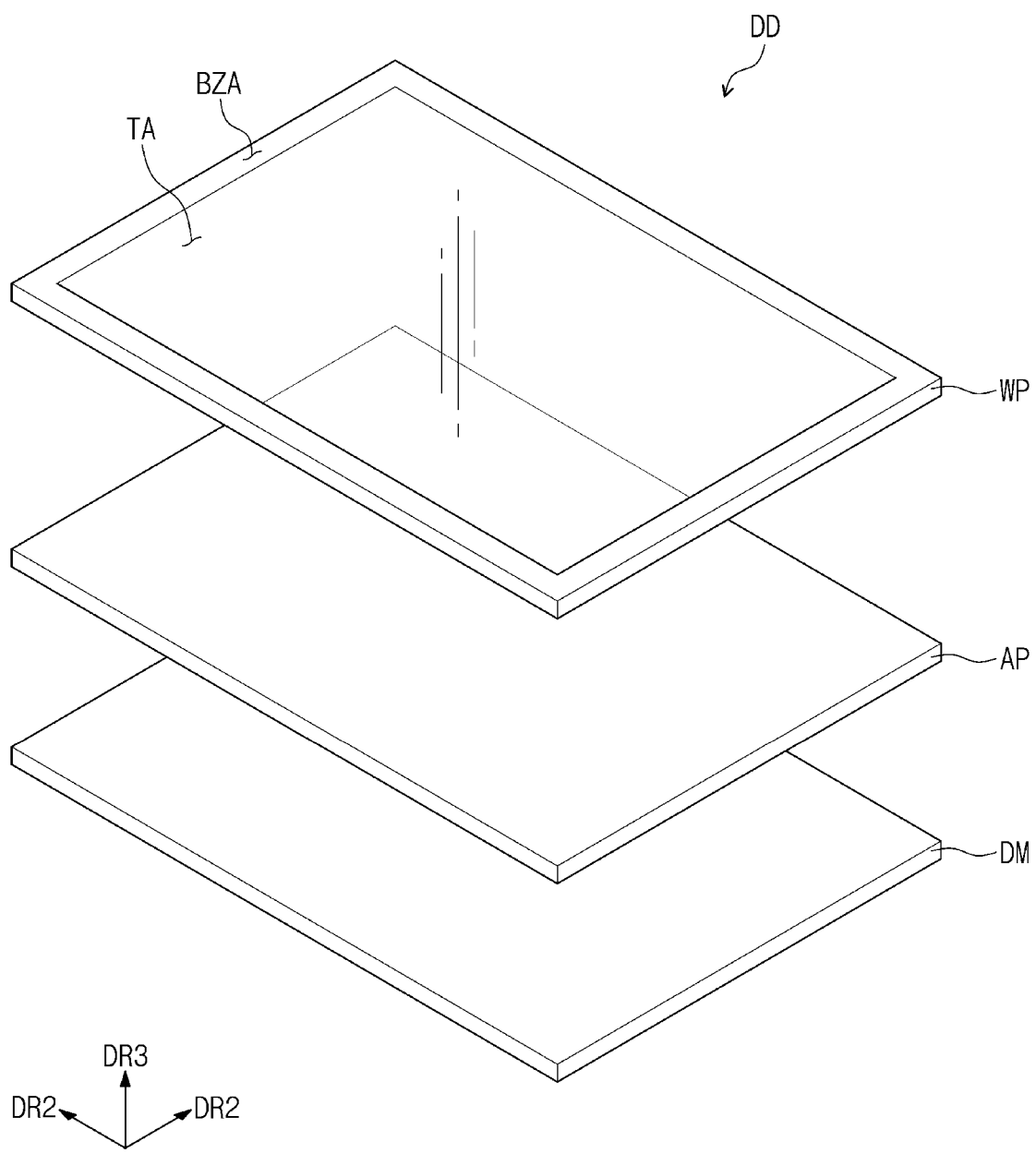
FIG. 6 is an exploded perspective view of a display device according to an embodiment.
Figure 7:
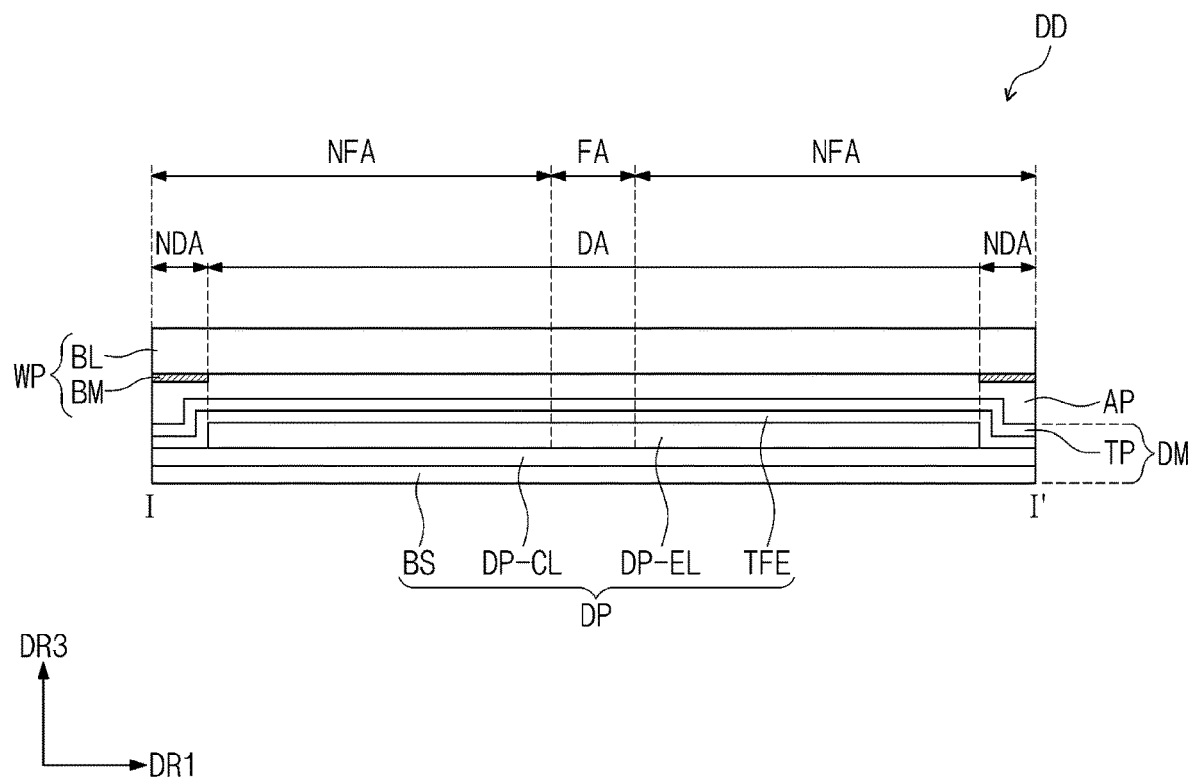
FIG. 7 is a schematic cross-sectional view of a display device of a portion corresponding to line I-F of FIG. 1 according to an embodiment.

FIG. 6 is an exploded perspective view of a display device DD of an embodiment. FIG. 7 is a schematic cross-sectional view of a display device DD according to an embodiment. FIG. 7 is a schematic cross-sectional view of a portion corresponding to line I-I' of FIG. 1.

The display device DD of an embodiment may include a display module DM, and a window WP disposed on the display module DM. In the display device DD of an embodiment, the display module DM may include a display panel DP having a display element layer DP-EL, and an input sensing unit TP disposed on the display panel DP. The display device DD of an embodiment may include an adhesive member AP disposed between the display panel DP and the window WP. For example, in the display device DD of an embodiment, the adhesive member AP may be disposed between the input sensing unit TP and the window WP. The adhesive member AP may be an optically clear adhesive film (OCA) or an optically clear adhesive resin layer (OCR).

The adhesive member AP may be formed from a resin composition of an embodiment. The adhesive member AP may include a polymer derived from the resin composition of an embodiment.

The resin composition according to an embodiment may include a (meth)acrylate (A) containing a hydroxy group and having a molecular weight of about 500 or less, and a polymer (B) having polyisoprene or polybutadiene as a main skeleton, having at least one radical reactive group in one molecule, and having a molecular weight in a range of about 2,000 to about 35,000. In the description, (meth) acrylate refers to acrylate or methacrylate.

In the resin composition of an embodiment, the (meth) acrylate (A) is a (meth)acrylate having a weight average molecular weight (Mw) in a range of about 100 to about 500. The (meth)acrylate (A) is a (meth)acrylate containing at least one hydroxy group in one molecule. The (meth) acrylate (A) may include different (meth)acrylates. For example, the resin composition of an embodiment may include two types or more of (meth)acrylates (A). For example, in the resin composition of an embodiment, the (meth)acrylate (A) may include one type of hydroxy propyl acrylate and one type of hydroxy ethyl acrylate.

The (meth)acrylate (A) may include hydroxy butyl acrylate, hydroxy propyl acrylate, hydroxy ethyl acrylate, or a mixture thereof. The resin composition of an embodiment may include, as a (meth)acrylate (A), 4-hydroxy butyl acrylate, 3-hydroxy propyl acrylate, 2-hydroxy propyl acrylate, 2-hydroxy ethyl acrylate, or a mixture thereof.

The resin composition of an embodiment may contain the (meth)acrylate (A) in an amount in a range of about 5 wt % to about 30 wt % with respect to a total 100 wt % of the resin composition. The resin composition of an embodiment contains the (meth)acrylate (A) in an amount in a range of about 5 wt % to about 30 wt %, and may thus exhibit a low viscosity in a range of about 5 mPa·s to about 50 mPa·s in a resin state, and have a glass transition temperature in a range of about −50° C. to about 0° C. after photocuring. The resin composition of an embodiment contains the (meth) acrylate (A) in an amount in a range of about 5 wt % to about 30 wt %, and an adhesive member formed by curing the resin composition of an embodiment may thus have high adhesion to a polyethylene terephthalate film and glass, thereby having flexibility to be applicable to folding devices.

The resin composition of an embodiment may contain a polymer (B) having a weight average molecular weight in a range of about 2,000 to about 35,000. The polymer (B) may be a polymer material having at least one radical reactive group in one molecule, and having polyisoprene or polybutadiene as a main skeleton. The polymer (B) may include different polymer materials. For example, the resin composition of an embodiment may include two types or more of polymers (B). For example, the resin composition of an embodiment may contain, as a polymer (B), one type of polyisoprene compound having a radical reactive group and one type of polybutadiene compound having a radical reactive group.

The polymer (B) may contain a polyisoprene compound having a radical curable group, a polybutadiene compound having a radical curable group, or a mixture thereof. The resin composition of an embodiment may contain, as a polymer (B), UC-102M (Kuraray company), UC-203M (Kuraray company), TEAI-1000 (Nippon Soda Co., Ltd.) or a mixture thereof.

The resin composition of an embodiment may contain the polymer (B) in an amount in a range of about 5 wt % to about 30 wt % with respect to a total 100 wt % of the resin composition. The resin composition of an embodiment may contain the (meth)acrylate (A) in an amount in a range of about 0.1 wt % to about 5 wt %, and may thus exhibit a low viscosity in a range of about 5 mPa·s to about 50 mPa·s in a resin state, and have a glass transition temperature in a range of about −50° C. to about 0° C. after photocuring. The resin composition of an embodiment contains the polymer (B) in an amount in a range of about 0.1 wt % to about 5 wt %, and an adhesive member formed by curing the resin composition of an embodiment may thus have high adhesion to a polyethylene terephthalate film and glass, thereby having flexibility to be applicable to folding devices.

The resin composition of an embodiment may further include a monofunctional (meth)acrylate (C). The resin composition of an embodiment may further include a monofunctional (meth)acrylate (C) different from the (meth)acrylate (A) and the polymer (B).

The monofunctional (meth)acrylate (C) refers to a (meth)acrylate having one functional group. By way of non-limiting example, the monofunctional (meth)acrylate (C) refers to a (meth)acrylate in which one (meth)acryloyl group is included in one molecule. In the resin composition of an embodiment, the monofunctional (meth)acrylate (C) may include different (meth)acrylates. For example, in the resin composition of an embodiment, the monofunctional (meth)acrylate (C) may include at least one monofunctional acrylate and at least one monofunctional methacrylate.

The monofunctional (meth)acrylate (C) may include, for example, phenoxyethyl (meth)acrylate, phenoxyethoxyethyl (meth)acrylate, phenoxyhydroxypropyl (meth)acrylate, phenylphenoxyethyl (meth)acrylate, bromophenoxyethyl (meth)acrylate, polyoxyethylene nonylphenyl ether (meth)acrylate, isobornyl (meth)acrylate, adamantyl (meth)acrylate, methyladamantyl (meth)acrylate, ethyladamantyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, butylcyclohexyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, hexyl (meth)acrylate, heptyl (meth)acrylate, octyl (meth)acrylate, isooctyl (meth)acrylate, ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth)acrylate, benzyl (meth)acrylate, ethoxydiethylene glycol (meth)acrylate, polyethylene glycol mono(meth)acrylate, polypropylene glycol mono(meth)acrylate, methoxyethylene glycol (meth)acrylate, ethoxyethyl (meth)acrylate, or a mixture thereof. In the resin composition of an embodiment, the monofunctional (meth)acrylate (C) may contain at least one of isodecyl acrylate or 2-methyl-2-ethyl-1,3-dioxolan-4-yl methylacrylate. The monofunctional (meth)acrylate (C) may contain at least one of isodecyl acrylate or medol-10 (Osaka Organic Chemical Industry Ltd.).

The resin composition of an embodiment may contain the monofunctional (meth)acrylate (C) in an amount in a range of about 50 wt % to about 88 wt % with respect to the total 100 wt % of the resin composition. The resin composition of an embodiment may contain the monofunctional (meth)acrylate (C) in an amount in a range of about 50 wt % to about 88 wt %, and may thus exhibit a low viscosity in a range of about 5 mPa·s to about 50 mPa·s in a resin state, and have a glass transition temperature in a range of about −50° C. to about 0° C. after photocuring. The resin composition of an embodiment contains the monofunctional (meth)acrylate (C) in an amount in a range of about 50 wt % to about 88 wt %, and an adhesive member formed by curing the resin composition of an embodiment may thus have high adhesion to a polyethylene terephthalate film and glass, thereby having flexibility to be applicable to folding devices.

The resin composition of an embodiment may further include a urethane (meth)acrylate oligomer (D). The urethane (meth)acrylate oligomer (D) may have a weight average molecular weight of about 6,000 or greater. In the resin composition of an embodiment, the urethane (meth)acrylate oligomer (D) may have a weight average molecular weight in a range of about 27,000 to about 50,000.

In an embodiment, the urethane (meth)acrylate oligomer (D) may include a photocurable compound containing at least one (meth)acryloyl group having a urethane bond. The urethane acrylate oligomer (D) may include at least one of acrylate having a urethane bond, urethane acrylate having a polycarbonate skeleton, or urethane acrylate having a polyether skeleton. For example, the resin composition of an embodiment may contain, as a urethane acrylate oligomer, at least one of UF-0051 (Kyoeisha Chemical Co., Ltd.) or UN7700 (Negami Chemical Industrial).

The resin composition containing the urethane (meth)acrylate oligomer (D) having a weight average molecular weight of about 6,000 or greater may exhibit low viscosity properties that may be applied through methods such as inkjet printing or dispensing coating. The urethane (meth)acrylate oligomer (D) having a weight average molecular weight of about 6,000 or greater is included in the resin composition in an oligomer state having a relatively high polymerization degree to keep the high polymerization degree even after photocuring, and may thus exhibit low storage modulus (G') values and high peel strength properties.

The resin composition of an embodiment may contain the urethane (meth)acrylate oligomer (D) in an amount in a range of about 1 wt % to about 15 wt % with respect to the total 100 wt % of the resin composition. The resin composition of an embodiment may include the urethane (meth)acrylate oligomer (D) having a weight average molecular weight of about 6,000 or greater in an amount in a range of about 1 wt % to about 15 wt %, and thus exhibits a low viscosity in a range of about 5 mPa·s to about 50 mPa s in a resin state, and has a glass transition temperature in a range of about −50° C. to about 0° C. after photocuring, and accordingly, in case that the adhesive member formed of the resin composition of an embodiment is applied to foldable display devices, the display devices may have improved folding characteristics.

The resin composition of an embodiment may further include at least one photo initiator. In case that the resin composition may include photo initiators, different photo initiators may be activated by UV having different central wavelengths.

The photo initiator may be any one selected among 2,2-dimethoxy-1,2-diphenylethan-1-one, 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, and 2-hydroxy-1-{4-[4-(2-hydroxy-2-methyl-propionyl)-benzyl]-phenyl}-2-methylpropan-1-one.

The photo initiator may be any one selected among 2-methyl-1[4-(methylthio)phenyl]-2-morpholinopropan-1-one, 2-benzyl-2-dimethylamino-1-(4-morpholinophenyl)-butanone-1, 2-dimethylamino-2-(4-methyl-benzyl)-1-(4-morpholin-4-yl-phenyl)-butan-1-one, 2,4,6-trimethylbenzoyl-diphenylphosphine oxide, 2,4,6-trimethylbenzoyl-diphenyl phosphinate, bis(2,4,6-trimethylbenzoyl)-phenylphosphineoxide, [1-(4-phenylsulfanylbenzoyl)heptylideneamino]benzoate, [1-[9-ethyl-6-(2-methylbenzoyl)carbazol-3-yl]ethylideneamino] acetate), and bis(2,4-cyclopentadienyl)bis[2,6-difluoro-3-(1-pyrryl)phenyl] titanium(IV). The resin composition of an embodiment may include, as a photo initiator, at least one among omnirad TPO-H (IGM Resins), omnirad819 (IGM Resins), and esacure 3644 (IGM Resins).

The resin composition of an embodiment may further include other additives such as a curing accelerator. The curing accelerator may include a polyfunctional amine acrylate, and may accelerate the photocuring reaction of the resin composition of an embodiment. For example, the resin composition of an embodiment may include photomer 4250 (IGM) as a curing accelerator.

The resin composition of an embodiment may not contain a separate organic solvent. As an example, the resin composition of an embodiment may contain an organic solvent, but the organic solvent may be contained in an amount of about 1 wt % or less with respect to the total 100 wt % of the resin composition. The resin composition of an embodiment may not contain an organic solvent or contains an organic solvent in an amount of about 1 wt % or less, and may thus improve the processability of the resin composition, and reduce costs in case that an adhesive member is formed through the resin composition of an embodiment.

In order to apply the adhesive member formed through the resin composition to a flexible display device, the flexibility of the adhesive member is required to be secured. To this end, plasticizers were used in existing resin compositions, but the plasticizers often cause, after UV curing, a decrease in durability at high temperatures, poor curing due to layer separation, and white turbidity, and most plasticizers are polymer compounds having high molecular weight to cause an increase in viscosity of the resin composition, thereby failing to provide the resin composition through an inkjet process, for example. In order to apply the resin composition including plasticizers to an inkjet process, for example, an organic solvent needs to be used, but in case that using the organic solvent, processing such as removal of the organic solvent after curing may become difficult.

The resin composition of an embodiment may have high flexibility without using plasticizers and organic solvents, form an adhesive member having high stability at low and high temperatures, has excellent processability in a state of the resin composition, and may thus form an adhesive member applied to a flexible display device through an inkjet process, for example.

The resin composition of an embodiment may have a viscosity in a range of about 5 mPa·s to about 50 mPa·s at about 20° C. to about 30° C. For example, the resin composition according to an embodiment may have a viscosity in a range of about 5 mPa·s to about 50 mPa·s at about 25° C. The viscosity of the resin composition was measured according to the JIS K 2283 method.

In case that the resin composition of an embodiment has a viscosity of less than about 5 mPa·s at about 20° C. to about 30° C., the viscosity is low to cause a flow of the resin composition liquid provided for forming an adhesive member, and accordingly, it may be difficult to form a coating film having a uniform thickness using the resin composition. In case that the resin composition of an embodiment has a viscosity of greater than about 50 mPa·s at about 20° C. to about 30° C., it may be difficult for the resin composition to be discharged in an appropriate amount from an applicator used to apply the resin composition.

A liquid resin composition is cured through UV irradiation, and may be formed in the form of a film or thin film after UV curing. After the resin composition of an embodiment is UV-cured, a glass substrate or a polyethylene terephthalate (PET) film may have a 180° peel strength of about 1000 gf/25 mm or greater.

The resin composition cured through the UV irradiation may have a low glass transition temperature. The resin composition of an embodiment may have a glass transition temperature in a range of about −50° C. to about 0° C. after UV curing. In case that the glass transition temperature of the resin composition of an embodiment is greater than 0° C. after UV curing, the cured resin composition may have reduced durability and flexibility at low temperature.

The display panel DP may include a base substrate BS, a circuit layer DP-CL disposed on the base substrate BS, and a display element layer DP-EL disposed on the circuit layer DP-CL, and an encapsulation layer TFE covering or overlapping the display element layer DP-EL. For example, the display panel DP may include organic light emitting elements or quantum dot light emitting elements in the display element layer DP-EL.

The configuration or structure of the display panel DP shown in FIG. 7 is an example and the configuration or structure of the display panel DP is not limited to the one shown in FIG. 7. For example, the display panel DP may include a liquid crystal display element, and the encapsulation layer TFE may be omitted.

An input sensing unit TP may be disposed on the display panel DP. For example, the input sensing unit TP may be disposed on or directly disposed on the encapsulation layer TFE of the display panel DP. The input sensing unit TP may detect an external input to convert the input into a predetermined input signal, and provide the input signal to the display panel DP. For example, in the display device DD of an embodiment, the input sensing unit TP may be a touch sensing unit detecting a touch. The input sensing unit TP may recognize a user's direct touch, a user's indirect touch, a direct touch of an object, or an indirect touch of an object. The input sensing unit TP may detect at least any one of a location of a touch or strength (pressure) of a touch applied from the outside. The input sensing unit TP in an embodiment may have various structures or be formed of various materials, and is not limited to any one embodiment. The input sensing unit TP may include sensing electrodes (not shown) for detecting an external input. The sensing electrodes (not shown) may detect an external input in a capacitive manner. The display panel DP may receive an input signal from the input sensing unit TP and generate an image corresponding to the input signal.

The window WP may protect the display panel DP and the input sensing unit TP. An image IM generated from the display panel DP may be provided to users by being transmitted through the window WP. The window WP may provide a touch surface of the display device DD. In the display device DD including a folding area FA, the window WP may be a flexible window.

The window WP may include a base layer BL and a printing layer BM. The window WP may include a transmission area TA and a bezel area BZA. A front surface of the window WP including the transmission area TA and the bezel area BZA corresponds to a front surface of the display device DD.

The transmission area TA may be an optically transparent area. The bezel area BZA may be an area having a relatively lower light transmittance than the transmission area TA. The bezel area BZA may have a predetermined color. The bezel area BZA may be adjacent to the transmission area TA and may surround or may be adjacent to the transmission area TA. The bezel area BZA may define the shape of the transmission area TA. However, an embodiment is not limited to the one illustrated, the bezel area BZA may be disposed adjacent to only one side or a side of the transmission area TA, and a portion thereof may be omitted.

The base layer BL may be a glass or plastic substrate. For example, the base layer BL may be a tempered glass substrate. As an example, the base layer BL may be formed of a flexible polymer resin. For example, the base layer BL may be formed of polyimide, polyacrylate, polymethylmethacrylate, polycarbonate, polyethylenenaphthalate, polyvinylidene chloride, polyvinylidene difluoride, polystyrene, ethylene vinylalcohol copolymer, or a combination thereof. However, an embodiment is not limited thereto, and a general form as the base layer BL of the window WP in the art may be used without limitation.

The printing layer BM may be disposed on one surface or a surface of the base layer BL. In an embodiment, the printing layer BM may be provided or disposed on a lower surface of the base layer BL adjacent to the display panel DP. The printing layer BM may be disposed on an edge area of the base layer BL. The printing layer BM may be an ink printing layer. Further, the printing layer BM may be a layer formed by including a pigment or dye. In the window WP, the bezel area BZA may be a portion in which the printing layer BM is provided or disposed.

The window WP may further include at least one functional layer (not shown) provided or disposed on the base layer BL. For example, the functional layer (not shown) may be a hard coating layer, an anti-fingerprint coating layer, for example, but an embodiment is not limited thereto.

There may be a step between the portion provided with the printing layer BM and the base layer BL without the printing layer BM. An adhesive member AP of an embodiment formed from the resin composition of an embodiment described above has low elastic modulus and high adhesion values to be attached to the window WP without lifting at the step portion.

The adhesive member AP of an embodiment may include a polymer derived from the resin composition of an embodiment described above. For example, the adhesive member AP according to an embodiment may include a (meth) acrylate (A) containing a hydroxy group and having a molecular weight of about 500 or less, and a polymer (B) having polyisoprene or polybutadiene as a main skeleton, having at least one radical reactive group in one molecule, and having a molecular weight in a range of about 2,000 to about 35,000. The adhesive member AP of an embodiment may include a polymer derived from a resin composition containing a (meth)acrylate (A), a polymer (B), and further containing a monofunctional (meth)acrylate (C), a urethane (meth)acrylate oligomer (D), and a photo initiator. The description of the resin composition of an embodiment described above may be equally applied to the (meth) acrylate (A), the polymer (B), the monofunctional (meth) acrylate (C), the urethane (meth) acrylate oligomer (D), and the photo initiator.

The resin composition forming the adhesive member AP through a polymerization reaction using a photo initiator may have a viscosity in a range of about 5 mPa·s to about 50 mPa·s at about 20° C. to about 30° C., as measured according to the JIS K 2283 method. The glass transition temperature of the adhesive member AP according to an embodiment may be in a range of about −50° C. to about 0° C.

The 180° peel strength of the adhesive member AP for the glass substrate or the polyethylene terephthalate (PET) film may be about 1000 gf/25 mm or greater.

The adhesive member AP according to an embodiment may have high flexibility and adhesive properties, and have high stability and durability at each of low and high temperatures. Accordingly, the adhesive member AP according to an embodiment is applied to the flexible display device, thereby securing excellent folding characteristics.

The adhesive member AP included in the display device DD of an embodiment is provided or disposed on one surface or a surface of the window WP or one surface or a surface of the display module DM in a liquid resin composition state, and may be formed by UV-curing the liquid resin composition provided or disposed between the window WP and the display panel DP. Unlike the one above, the adhesive member AP may be provided by UV-curing the liquid resin composition in a separate process, laminating one surface or a surface of the adhesive member AP in a cured state in the form of an adhesive film on one surface or a surface of the window WP or one surface or a surface of the display module DM, and attaching one surface or a surface of the window WP or one surface or a surface of the display module DM, which is unattached, to the other or another surface of the adhesive member AP.

The adhesive member AP may have a thickness in a range of about 50 μm to about 200 μm. For example, the adhesive member AP may have a thickness in a range of about 100 μm to about 150 μm.

Figure 8A:
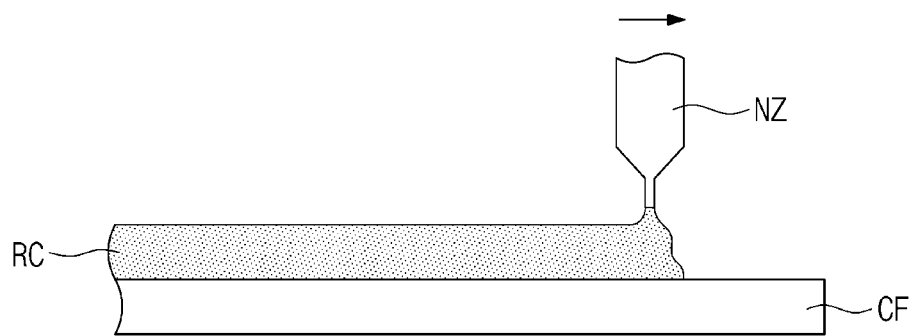
FIGS. 8A to 8C are views illustrating a method for manufacturing an adhesive member according to an embodiment.
Figure 8B:
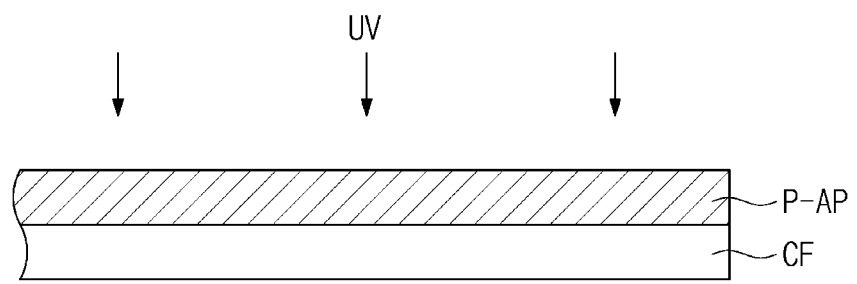
Figure 8C:
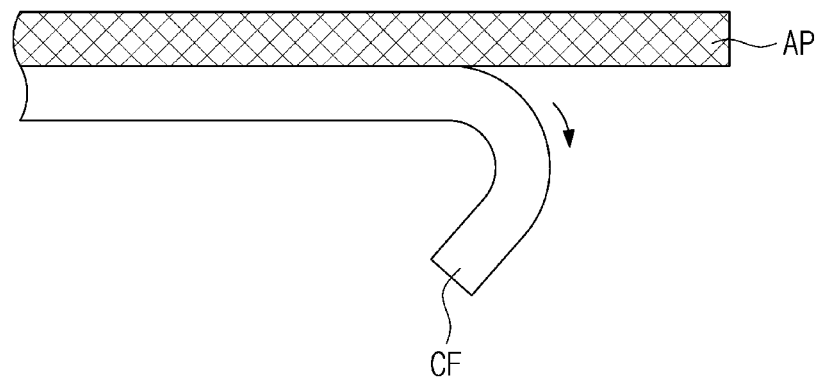

FIGS. 8A to 8C are views schematically illustrating preparing an adhesive member AP according to an embodiment. FIG. 8A illustrates providing a resin composition RC for forming an adhesive member AP, FIG. 8B illustrates performing UV irradiation, and FIG. 8C illustrates removing a carrier film CF.

Referring to FIGS. 8A to 8C, the resin composition RC may be provided on the carrier film CF. For example, a polyethylene terephthalate (PET) film may be used as the carrier film CF, but an embodiment is not limited thereto. The carrier film CF serves as a substrate for applying the liquid resin composition RC, and may be used without limitation as long as it is readily detached from the adhesive member AP after UV-curing. For example, release treatment may be performed on one surface or a surface of the carrier film CF provided with the resin composition RC.

The resin composition RC may be provided through methods such as an inkjet printing method or a dispensing method. The resin composition RC of an embodiment may be readily discharged from a nozzle NZ, for example, by having a viscosity value in a range of about 5 mPa·s to about 50 mPa·s at about 20° C. to about 30° C., and may be provided to keep a constant coating thickness. As an example, the resin composition RC of an embodiment may have a viscosity value in a range of about 5 mPa·s to about 50 mPa·s at about 25° C.

A pre-adhesive member P-AP provided by applying the resin composition RC to a constant thickness may be irradiated with UV. FIG. 8B illustrates that the coated pre-adhesive member P-AP may be irradiated with UV or directly irradiated with UV, but an embodiment is not limited thereto. An auxiliary carrier film (not shown) may be further disposed on the pre-adhesive member P-AP, and the auxiliary carrier film (not shown) transmits UV and may cover or overlap the pre-adhesive member P-AP during the UV-curing process.

After having UV-curing performed, the adhesive member AP may be formed. The adhesive member AP finally provided by removing the carrier film CF used in the process may have a glass transition temperature in a range of about −50° C. to about 0° C., and a 180° peel strength of about 1000 gf/25 mm or greater for a glass substrate or a polyethylene terephthalate (PET) film.

The adhesive member AP prepared in the steps of FIGS. 8A to 8C may be applied to the display device DD described above. For example, one surface or a surface of the adhesive member AP may be attached on the display module DM, and the window WP may be sequentially attached on the other or another surface of the adhesive member AP facing one surface or a surface of the adhesive member AP attached to the display module DM. Unlike the one above, the adhesive member AP may be provided to the display device DD by attaching one surface or a surface of the adhesive member AP on one surface or a surface of the window WP to face the display module DM, and attaching the other or another surface of the adhesive member AP facing one surface or a surface of the adhesive member AP attached to the window WP to the display module DM.

Figure 9A:
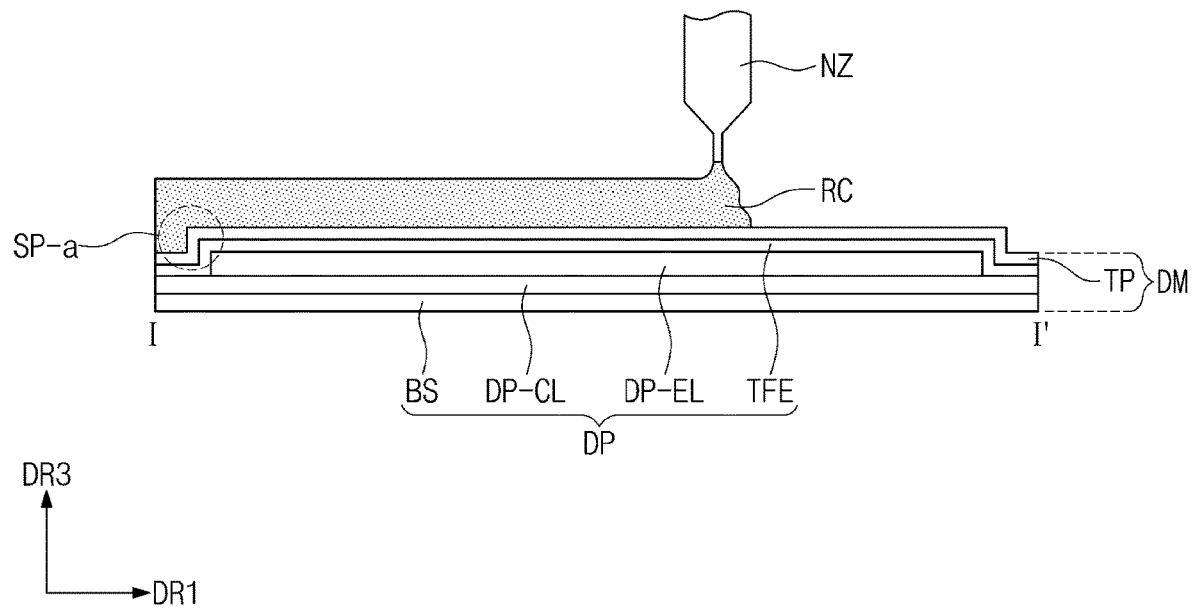
FIGS. 9A to 9B are views illustrating a method for manufacturing an adhesive member according to an embodiment.
Figure 9B:
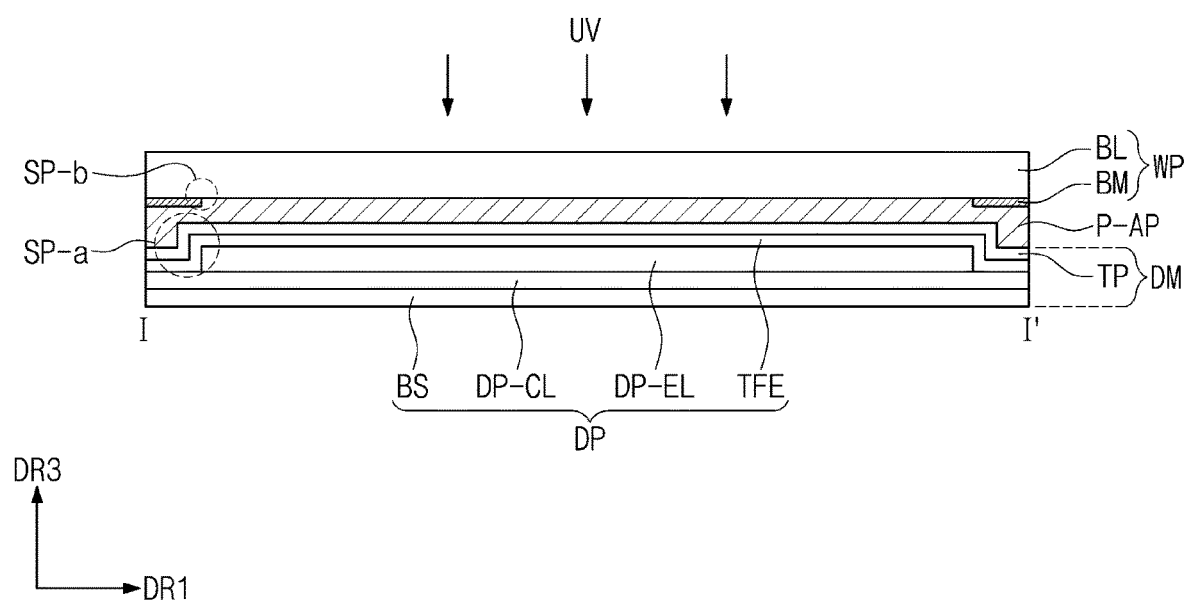

The resin composition provided in a liquid state between the display module DM and the window WP may be cured to form the adhesive member AP. FIGS. 9A and 9B illustrate preparing an adhesive member AP included in the display device DD through a method different from the method for preparing the adhesive member AP described with reference to FIGS. 8A to 8C.

FIG. 9A illustrates providing a resin composition RC on a display panel DP. FIG. 9B illustrates irradiating a pre-adhesive member P-AP formed from a resin composition RC with UV.

The resin composition RC may be provided through methods such as an inkjet printing method or a dispensing method. The resin composition RC of an embodiment may be readily discharged from a nozzle NZ, for example, by having a viscosity value in a range of about 5 mPa·s to about 50 mPa·s at about 25° C., and may be provided to keep a thin, constant coating thickness. The resin composition has a viscosity value in a range of about 5 mPa·s to about 50 mPa·s, and may thus be provided while covering or overlapping the step SP-a unevenness of the display module DM. For example, the resin composition RC has a viscosity value of about 50 mPa·s or less, and may thus be filled with no empty space in an uneven portion such as a step portion SP-a. The resin composition RC provided through the nozzle NZ has a viscosity value of about 5 mPa·s or greater to be uniformly applied to a predetermined thickness without flowing out of the display module DM.

The window WP may be provided or disposed on the pre-adhesive member P-AP provided by applying the resin composition RC to a constant thickness. UV for curing the resin composition RC may be provided through the window WP. In case that the window WP is provided or disposed on the pre-adhesive member P-AP, the resin composition RC may be filled without an empty space in a step portion SP-b.

For example, the resin composition RC has a low viscosity value of about 50 mPa·s or less, thereby covering or overlapping the curve shape at the curved portion such as the step portion SP-a between the base layer BL and the printing layer BM to provide the pre-adhesive member P-AP. The pre-adhesive member P-AP may be cured after polymerization by the provided UV to form the adhesive member AP.

Unlike that shown in FIG. 9B, before the window WP is provided or disposed on the pre-adhesive member P-AP, UV is provided to the pre-adhesive member P-AP to perform a polymerization reaction in the resin composition RC. The amount of UV irradiation may be an amount of light that serves to fully cure the resin composition RC. However, unlike the one above, the final adhesive member AP may be formed by partially performing the polymerization reaction of the resin composition RC in the pre-adhesive member P-AP state, and further reacting an unreacted resin composition RC after covering or overlapping the window WP.

The display devices DD, DD-a, and DD-b according to an embodiment shown in FIGS. 1 to 5 include an adhesive member AP including a polymer derived from the resin composition of an embodiment described above to keep the adhesive state of the window WP and the display panel DP, using the adhesive member AP, even in the folded state or the bending area, without lifting of the adhesive member AP.

Figure 10:
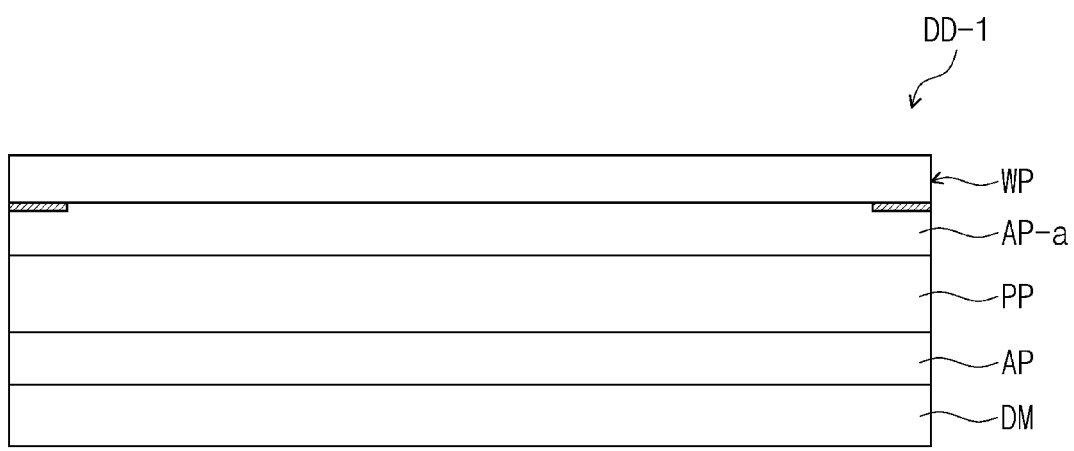
FIG. 10 is a schematic cross-sectional view of a display device according to an embodiment.

FIG. 10 is a schematic cross-sectional view illustrating a display device according to an embodiment. Hereinafter, in the description of the display device of an embodiment illustrated in FIG. 10, duplicate descriptions as described with reference to FIGS. 1 to 9B described above will not be described again, and differences will be described.

Compared with the display device DD described with reference to FIGS. 6 and 7, a display device DD-1 of an embodiment shown in FIG. 10 may further include a light control layer PP and an optical adhesive layer AP-a. The display device DD-1 of an embodiment may further include a light control layer PP disposed between the adhesive member AP and the window WP, and an optical adhesive layer AP-a disposed between the light control layer PP and the window WP.

The light control layer PP may be disposed on the display panel DP to control reflected light from the display panel DP due to external light. The light control layer PP may include, for example, a polarizing layer or a color filter layer.

The optical adhesive layer AP-a may be an optically clear adhesive film (OCA) or an optically clear adhesive resin layer (OCR). The optical adhesive layer AP-a may be formed from the resin composition of an embodiment in the same manner as the adhesive member AP (FIG. 7) of an embodiment described above. For example, the optical adhesive member AP-a of an embodiment may include a polymer derived from a resin composition containing a (meth)acrylate (A), a polymer (B), a monofunctional (meth)acrylate (C), a urethane (meth)acrylate oligomer (D), and a photo initiator.

The resin composition forming the optical adhesive member AP-a through a polymerization reaction using a photo initiator may have a viscosity in a range of about 5 mPa·s to about 50 mPa·s at about 20° C. to about 30° C., as measured according to the JIS K 2283 method. The glass transition temperature of the optical adhesive member AP-a according to an embodiment may be in a range of about −50° C. to about 0° C. The optical adhesive layer AP-a according to an embodiment may have a low glass transition temperature value in a range of about −50° C. to about 0° C.

The 180° peel strength of the optical adhesive member AP-a for the glass substrate or the polyethylene terephthalate (PET) film may be about 1000 gf/25 mm or greater.

The optical adhesive member AP-a according to an embodiment may have high flexibility and adhesive properties, and have high stability and durability at each of low and high temperatures. Accordingly, the optical adhesive member AP-a according to an embodiment may be applied to a flexible display device, thereby securing excellent folding characteristics.

The display device DD-1 of an embodiment may include an optical adhesive layer AP-a and an adhesive member AP formed from the resin composition of an embodiment, and the optical adhesive layer AP-a and the adhesive member AP have a low glass transition temperature, high flexibility and adhesive properties, and high stability and durability at each of low and high temperatures, thereby preventing lifting at an interface between the optical adhesive layer AP-a and the adhesive member AP even in case that the display device DD-1 is folded or bent, and may thus exhibit excellent reliability characteristics.

Figure 11:
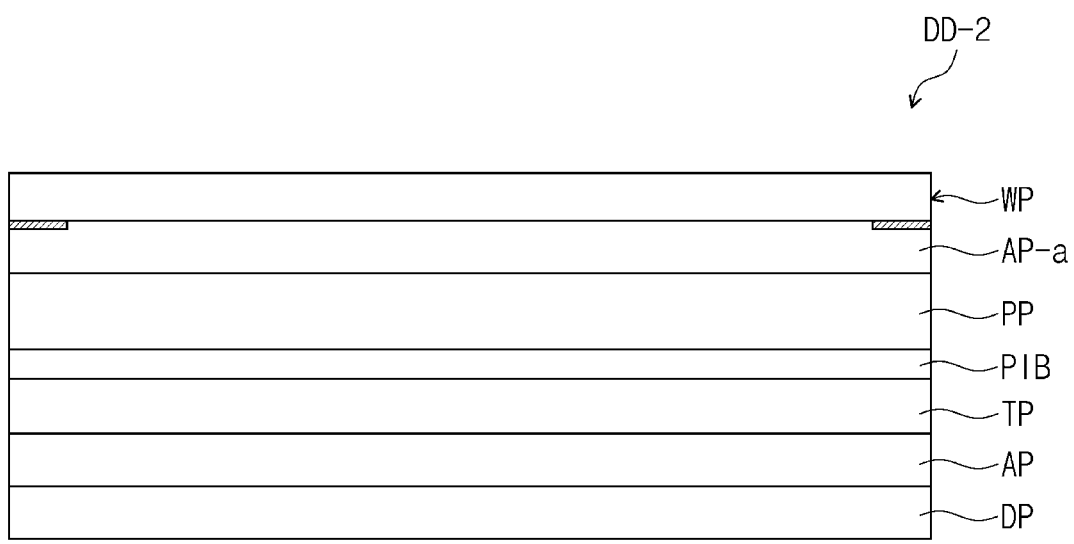
FIG. 11 is a schematic cross-sectional view of a display device according to an embodiment.

FIG. 11 is a schematic cross-sectional view illustrating a display device according to an embodiment. Hereinafter, in the description of the display device of an embodiment illustrated in FIG. 11, duplicated descriptions as described with reference to FIGS. 1 to 10 described above will not be described again, and differences will be described.

Compared with the display device DD described with reference to FIGS. 6 and 7, a display device DD-2 of an embodiment shown in FIG. 11 may further include a light control layer PP, an optical adhesive layer AP-a, and an interlayer adhesive layer PIB. As the display device DD-1 of an embodiment illustrated in FIG. 10, the display device DD-2 of an embodiment may further include a light control layer PP disposed between the adhesive member AP and the window WP, and an optical adhesive layer AP-a disposed between the light control layer PP and the window WP.

In the display device DD-2 according to an embodiment, the adhesive member AP may be provided between the display panel DP and the input sensing unit TP. For example, the input sensing unit TP may not be disposed on or directly disposed on the display panel DP, and the display panel DP and the input sensing unit TP may be bonded to each other through the adhesive member AP. For example, the adhesive member AP may be disposed between the encapsulation layer TFE (FIG. 7) of the display panel DP and the input sensing unit TP.

The interlayer adhesive layer PIB may be provided or disposed below the light control layer PP. The interlayer adhesive layer PIB may be disposed between the input sensing unit TP and the light control layer PP, and may be formed of an adhesive material having excellent moisture permeation prevention properties. For example, the interlayer adhesive layer PIB may be formed including polyisobutylene. The interlayer adhesive layer PIB may be disposed on the input sensing unit TP to prevent corrosion of the sensing electrodes of the input sensing unit TP.

The display device DD-2 of an embodiment may include an optical adhesive layer AP-a and an adhesive member AP formed from the resin composition of an embodiment, and the optical adhesive layer AP-a and the adhesive member AP exhibit a low storage modulus value and a high elastic recovery force, thereby preventing lifting at an interface between the optical adhesive layer AP-a and the adhesive member AP even in case that the display device DD-2 is folded or bent, and may thus exhibit excellent reliability characteristics.

Hereinafter, with reference to Examples and Comparative Examples, a resin composition, an adhesive member, and a display device of an embodiment will be described. Examples shown below are illustrated only for the understanding of the disclosure, and the scope of the disclosure is not limited thereto.

EXAMPLES

1. Preparation of Curable Liquid Resin Compositions

The resin compositions of the Examples were prepared at the blending ratios listed in Table 1. The resin compositions of Comparative Examples were prepared at the blending ratios listed in Table 2. After providing forming materials of Examples and Comparative Examples in a heat-resistant, light-shielding container in the weight ratios disclosed in Tables 1 and 2, as a photo initiator and hardening accelerator, a mixture in which omnirad TPO-H, esacure 3644, omnirad 819, and photomer 4250 were mixed at a weight ratio of 60:10:30:1 was provided in an amount of 2 wt % with respect to a total 100 wt % of the resin composition. Thereafter, the provided materials were stirred at 1000 rpm for 30 minutes using a planetary mixer (manufactured by SHASHIN KAGAKU CO., LTD.) at room temperature to obtain a curable resin composition.

TABLE 1

| Material | (Meth)acrylate (A) | | | Polymer (B) | | | Monofunctional (meth)acrylate (C) | | Urethane (meth)acrylate oligomer (D) | Organic solvent | |
|---|---|---|---|---|---|---|---|---|---|---|---|
| | 4-HBA | 3-HPA | HEA | UC-102M | UC-203M | TEAI-1000 | IDAA | Medol-10 | UF-C051 | MEK | Ethanol |
| Molecular weight | 144 | 130 | 116 | 17000 | 35000 | 2000 | 212 | 200 | 35000 | 72 | 46 |
| Example 1 | 10 | — | — | 0.1 | — | — | 65 | 15 | 9.9 | — | — |
| Example 2 | 10 | — | — | 5 | — | — | 65 | 15 | 5 | — | — |
| Example 3 | 5 | — | — | — | 1 | — | 70 | 15 | 9 | — | — |
| Example 4 | 30 | — | — | — | 1 | — | 50 | 10 | 9 | — | — |
| Example 5 | — | 10 | — | — | — | 1 | 60 | 15 | 14 | — | — |
| Example 6 | — | — | 10 | — | — | 5 | 69 | 15 | 1 | — | — |
| Example 7 | 10 | — | — | — | 2 | 2 | 65 | 15 | 6 | — | — |
| Example 8 | — | 5 | 5 | 1 | — | — | 65 | 15 | 9 | — | — |
| Example 9 | 10 | — | — | 0.1 | — | — | 65 | 15 | 9.9 | 1 | — |
| Example 10 | 10 | — | — | 0.1 | — | — | 65 | 15 | 9.9 | — | 1 |
| Example 11 | 10 | — | — | 0.1 | — | — | 65 | 15 | 9.9 | — | — |

TABLE 2

| Material | (Meth)acrylate (A) | | Polymer (B) | | | Monofunctional (meth)acrylate (C) | | | | | Urethane (meth)acrylate oligomer (D) | | Oil gelling agent | Organic solvent | | |
|---|---|---|---|---|---|---|---|---|---|---|---|---|---|---|---|---|
| | 4-HBA | HEA | UC-102M | UC-203M | TEAI-1000 | IDAA | Medol-10 | FA-512AS | IBXA | L-A | UF-C051 | UN7700 | UN7700 | HSA | Ethanol | Acetone |
| Molecular weight | 144 | 116 | 17000 | 35000 | 2000 | 212 | 200 | 248 | 208 | 240 | 35000 | 20000 | 300 | 72 | 46 | 58 |
| Comparative Example 1 | 10 | — | — | — | — | 65 | 15 | — | — | — | 10 | — | — | — | — | — |
| Comparative Example 2 | 10 | — | 10 | — | — | 55 | 15 | — | — | — | 10 | — | — | — | — | — |
| Comparative Example 3 | 10 | — | — | 1 | — | 35 | 45 | — | — | — | 9 | — | — | — | — | — |
| Comparative Example 4 | 10 | — | — | — | 1 | 80 | — | — | — | — | 9 | — | — | — | — | — |
| Comparative Example 5 | — | 10 | — | — | 1 | 88 | — | — | — | — | 9 | — | — | — | — | — |
| Comparative Example 6 | 10 | — | — | 5 | — | 55 | 10 | — | — | — | 20 | — | — | — | — | — |
| Comparative Example 7 | — | — | 0.1 | — | — | 75 | 15 | — | — | — | 9.9 | — | — | — | — | — |
| Comparative Example 8 | 50 | — | 0.1 | — | — | 25 | 15 | — | — | — | 9.9 | — | — | — | — | — |
| Comparative Example 9 | 5 | — | 55 | — | — | — | — | — | — | 10 | 30 | — | — | — | — | — |
| Comparative Example 10 | — | — | 5 | — | — | 45 | — | — | — | — | 50 | — | — | — | — | — |
| Comparative Example 11 | 20 | — | — | — | — | — | — | — | 40 | 20 | — | 20 | — | — | — | — |
| Comparative Example 12 | 10 | — | 0.1 | — | — | 60 | 15 | — | — | — | 9.9 | — | 5 | — | — | — |
| Comparative Example 13 | 10 | — | 0.1 | — | — | 64 | 15 | — | — | — | 9.9 | — | 1 | — | — | — |
| Comparative Example 14 | — | — | — | 30 | — | — | 69 | — | — | — | — | — | 1 | — | — | — |
| Comparative Example 15 | — | — | — | 80 | — | — | 19 | — | — | — | — | — | 1 | — | — | — |
| Comparative Example 16 | 1 | — | — | — | — | 65 | 15 | — | — | — | 10 | — | — | 2 | — | — |
| Comparative Example 17 | 1 | — | — | — | — | 65 | 15 | — | — | — | 10 | — | — | 10 | — | — |
| Comparative Example 18 | 1 | — | — | — | — | 65 | 15 | — | — | — | 10 | — | — | — | 10 | — |
| Comparative Example 19 | 1 | — | — | — | — | 65 | 15 | — | — | — | 10 | — | — | — | — | 10 |

<Data on Materials Used as Components of Examples and Comparative Examples>

Data for materials used in Examples and Comparative Examples disclosed in Tables 1 and 2 are as follows.

4-HBA: 4-hydroxy butyl acrylate
3-HPA: 3-hydroxy propyl acrylate
HEA: Hydroxy ethyl acrylate
UC-102M: Polyisoprene compound having a radical curable group (Kuraray company)
UC-203M: Polyisoprene compound having a radical curable group (Kuraray company)
TEAI-1000: Polybutadiene compound having a radical curable group (Nippon Soda Co., Ltd.)
IDAA: Isodecyl acrylate
Medol-10: 2-methyl-2-ethyl-1,3 dioxolan-4-ylmethyl-acrylate (Osaka Organic Chemical Industry Ltd.)
IBXA: Isobornyl acrylate
FA-512AS: Dicyclopentenyloxyethyl acrylate
L-A: Lauryl acrylate
UF-0051: Urethane acrylate (Kyoeisha Chemical Co., Ltd.)
UN7700: Urethane acrylate (Negami Chemical Industrial)
HAS: 12-hydroxy stearic acid
MEK: Methyl ethyl ketone 1. Evaluation of Physical Properties of Resin Composition and Adhesive Member Formed from the Resin Composition In Table 3 below, the viscosity of the resin composition having the composition ratios of Tables 1 and 2 and the application characteristics of an inkjet printer, glass transition temperature of a cured product formed by curing the resin composition, curing properties, 180° peel strength, high temperature durability, low temperature durability, and flexural adhesiveness were measured and shown. The viscosity of the resin composition, the application characteristics of the inkjet printer, the glass transition temperature of the cured product, the curing properties, the 180° peel strength, the high temperature durability, the low temperature durability, and the flexural adhesiveness were measured using a method below.

[Method of Viscosity Measurement]

The viscosity of the resin composition described in the description was measured at 25° C. according to the JIS K 2283 method, and the viscosity of the liquid photocurable resin composition was measured at 10 rpm using a viscometer TVE-25L (TOM SANGYO).

[Measurement of Glass Transition Temperature of Cured Product]

Using the curable resin compositions prepared in Examples and Comparative Examples, a cured resin product (size: 8 mm in diameter, 0.5 mm in thickness) was obtained through an integrated light intensity of 4000 mJ/cm$^2$ of UV irradiation with a metal halide lamp (Eye Graphics Co., Ltd., a conveyor type UV irradiation device), and the glass transition temperature (Tg) of the cured product was measured using a dynamic viscoelasticity measuring device (Anton Paar, MCR302). Measurement conditions were a frequency of 1 Hz, a temperature of −70° C. to 80° C., and a heating rate of 10° C./min.

[Evaluation of Curing Characteristics]

Using the curable resin compositions prepared in Examples and Comparative Examples, a polyethylene terephthalate film (Toyo Boseki Co., Ltd., Cosmoshine 4100, thickness: 100 μm) and a slide glass (Matsunami Glass Ind., Ltd., S1112) were bonded to obtain a curable resin composition having a thickness of 100 μm. After the bonding, at the slide glass side, UV irradiation was applied using a metal halide lamp (Eye Graphics Co., Ltd., conveyor type ultraviolet irradiation apparatus) at an integrated light intensity of 4000 mJ/cm2 to cure the curable resin compositions in order to obtain a laminate. Through observation of the appearance of the laminate obtained above, those with no white turbidity and poor curing were evaluated as "good", and those with at least one of white turbidity or poor curing were evaluated as "defective".

[Evaluation of Inkjet Printer Application Characteristics]

Using the curable resin compositions prepared in Examples and Comparative Examples, coating and UV curing were performed using an inkjet printer from MICROJET, and the appearance of the coated film after curing was observed. Based on the results of the observation, those applicable and having no thickness deviation were evaluated as "good", those applicable but having thickness deviation were evaluated as "defective", and those non-applicable were evaluated as "not applicable".

[Measurement of 180° Peel Strength]

The curable resin compositions prepared in Examples and Comparative Examples were applied onto a slide glass (Matsunami Glass Ind., Ltd., S1112) to obtain a curable resin composition having a thickness of 100 μm. Thereafter, using a UV-LED having a wavelength peak in the range of 365±5 nm, a UV temporary cured product layer was prepared through UV irradiation with an intensity of 100 mW/cm$^2$ for 2 seconds. A polyimide film (DU PONT-TORAY, [Kapton], thickness: 75 μm) and a slide glass (Matsunami Glass Ind., Ltd., [S1112]) are bonded onto the prepared UV temporary cured product layer and the resultant was treated for 5 minutes at 30° C. and 0.5 MPa, using an automatic heating and pressure treatment device (Chiyoda Electronics Co., Ltd., [ACS-230]). Thereafter, using a UV-LED having a wavelength peak in the range of 395±5 nm, a laminate was obtained through UV irradiation with an intensity of 500 mW/cm$^2$ for 4 seconds. Using the laminate, 180° peel tests were performed using a tensile tester (INSTRON, INSTRON 5965 type). Measurement conditions were 25° C. and a tensile speed of 300 mm/min.

[Measurement of High Temperature Durability]

A laminate of polyimide film/cured resin product/slide glass was obtained using the same method as the 180° peel strength measurement. The laminate obtained above was kept at a high temperature or high temperature and high humidity (for example, 85° C., 85% RH) for 72 hours to observe the occurrence of lifting, delamination, for example, at an interface with an adherend. Based on the results of observation, the laminate was evaluated as "good" in case that there was no change in appearance in the laminate, and evaluated as "defective" in case that there was lifting or delamination.

[Measurement of Low Temperature Durability]

A laminate of polyimide film/cured resin product/slide glass was obtained using the same method as the 180° peel strength measurement. The laminate obtained above was kept at a low temperature (for example, −20° C.) for 72 hours to observe the occurrence of lifting, delamination, for example, at an interface with an adherend. Based on the results of observation, the laminate was evaluated as "good" in case that there was no change in appearance in the laminate, and evaluated as "defective" in case that there was lifting or delamination.

[Flexural Adhesiveness Test]

At 23° C. and 50% RH, the formulations prepared in Examples and Comparative Examples were applied to one side or a side of a polyethylene terephthalate film (thickness: 100 μm), and integrated with another polyethylene terephthalate film (thickness: 100 μm) to perform a photoreaction at an integrated light intensity of 4000 mJ/cm2 of UV irradiation. The thickness of the laminate was measured and adjusted to form an adhesive layer having a thickness of 100 μm. The resultant was left for 24 hours at 23° C. and 50% RH. The PET film/adhesive layer/PET film laminate obtained through the process was cut into 50 mm in width and 200 mm in length as a sample.

The sample obtained above was repeatedly bent at 23° C., and a bending diameter of 3 mm using a durability tester (Yuasa System Co., Ltd., a U-shape folding test machine) and bent 30,000 times. Thereafter, the presence or absence of lifting and delamination of an interface between the adhesive layer and the adherend, and the presence or absence of leakage of the adhesive in the adhesive layer were visually checked, respectively, and durability was evaluated based on criteria below. Based on the results of observation, the laminate was evaluated as "good" in case that there was no change in appearance in the laminate, and evaluated as "defective" in case that there was lifting, delamination, or damage.

TABLE 3

| Evaluation item | Viscosity (mPa · s) | Cured product Tg (° C.) | Curing properties | Inkjet printer application | 180° peel strength (gf/25 mm) | High temperature durability | Low temperature durability | Flexural adhesion |
|---|---|---|---|---|---|---|---|---|
| Example 1 | 24 | −27 | Pass | Pass | 1740 | Pass | Pass | Pass |
| Example 2 | 20 | −50 | Pass | Pass | 1240 | Pass | Pass | Pass |
| Example 3 | 23 | −41 | Pass | Pass | 1380 | Pass | Pass | Pass |
| Example 4 | 32 | −1 | Pass | Pass | 3310 | Pass | Pass | Pass |
| Example 5 | 50 | −26 | Pass | Pass | 1990 | Pass | Pass | Pass |
| Example 6 | 5.1 | −19 | Pass | Pass | 2410 | Pass | Pass | Pass |
| Example 7 | 16 | −30 | Pass | Pass | 1560 | Pass | Pass | Pass |

TABLE 3-continued

| Evaluation item | Viscosity (mPa·s) | Cured product Tg (° C.) | Curing properties | Inkjet printer application | 180° peel strength (gf/25 mm) | High temperature durability | Low temperature durability | Flexural adhesion |
| --- | --- | --- | --- | --- | --- | --- | --- | --- |
| Example 8 | 19 | −25 | Pass | Pass | 1820 | Pass | Pass | Pass |
| Example 9 | 23 | −28 | Pass | Pass | 1690 | Pass | Pass | Pass |
| Example 10 | 23 | −27 | Pass | Pass | 1680 | Pass | Pass | Pass |
| Example 11 | 22 | −26 | Pass | Pass | 1720 | Pass | Pass | Pass |
| Comparative Example 1 | 25 | −27 | Pass | Pass | 1880 | Fail | Pass | Fail |
| Comparative Example 2 | 39 | −36 | Pass | Pass | 740 | Pass | Pass | Fail |
| Comparative Example 3 | 27 | 14 | Pass | Pass | 2470 | Pass | Fail | Fail |
| Comparative Example 4 | 18 | −58 | Pass | Pass | 1530 | Fail | Pass | Pass |
| Comparative Example 5 | 2.7 | −46 | Pass | Fail | 1290 | Pass | Pass | Pass |
| Comparative Example 6 | 71 | −31 | Pass | Fail | 1830 | Pass | Pass | Pass |
| Comparative Example 7 | 19 | −41 | Pass | Pass | 620 | Pass | Pass | Fail |
| Comparative Example 8 | 28 | −21 | Pass | Pass | 2940 | Pass | Fail | Fail |
| Comparative Example 9 | 6150 | −41 | Pass | Not applicable | 390 | Pass | Pass | Fail |
| Comparative Example 10 | 8170 | −46 | Pass | Not applicable | 550 | Pass | Pass | Fail |
| Comparative Example 11 | 88 | 54 | Pass | Fail | 570 | Pass | Fail | Fail |
| Comparative Example 12 | Not measurable | −4 | Pass | Not applicable | 120 | Pass | Pass | Fail |
| Comparative Example 13 | Not measurable | −24 | Pass | Not applicable | 50 | Pass | Pass | Fail |
| Comparative Example 14 | Not measurable | −9 | Pass | Not applicable | 60 | Pass | Pass | Fail |
| Comparative Example 15 | Not measurable | −31 | Pass | Not applicable | 90 | Pass | Pass | Fail |
| Comparative Example 16 | 21 | −23 | Fail | Pass | 1220 | Fail | Pass | Fail |
| Comparative Example 17 | 11 | Not measurable | Fail | Pass | Not measurable | Fail | Fail | Fail |
| Comparative Example 18 | 12 | Not measurable | Fail | Pass | Not measurable | Fail | Fail | Fail |
| Comparative Example 19 | 11 | Not measurable | Fail | Pass | Not measurable | Fail | Fail | Fail |

Referring to the results of Table 3, it is observed that Examples 1 to 11 have a low viscosity in a range of about 5 mPa·s to about 50 mPa·s in the resin composition state. The resin compositions of Examples 1 to 11 have low viscosity properties, and may thus be used to form a thin uniform coating film.

In Examples 1 to 11, the (meth)acrylate (A) in an amount of about 5 wt % to about 30 wt %, the polymer (B) in an amount of about 0.1 wt % to about 5 wt %, the monofunctional (meth)acrylate (C) in an amount of about 50 wt % to about 88 wt %, and the urethane (meth)acrylate oligomer (D) in an amount of about 1 wt % to about 15 wt % were used. It is observed that Examples 1 to 11 had, through the resin composition containing the above material combination, after photocuring, a low glass transition temperature, high adhesion properties to a glass substrate, for example, excellent durability at high and low temperatures, and excellent adhesiveness in the repeated act of folding. Accordingly, in case that an adhesive member applied to a flexible display device through the resin composition of the embodiment is formed, durability and folding characteristics may improve.

Compared to the resin compositions of Examples, Comparative Example 1 did not contain the polymer (B), and thus had reduced durability at high temperature, and had damaged cured resin in the flexural adhesiveness test (or bending adhesion test). Compared to the resin compositions of Examples, Comparative Example 2 contained the polymer (B) in an amount of greater than 5 wt %, and thus had reduced adhesion to glass and polyethylene terephthalate, and had delamination in the flexural adhesiveness test. It is observed that Compared to the resin compositions of Examples, in Comparative Example 3, the cured product had a glass transition temperature of greater than 0° C., and thus caused the cured resin composition to lose flexibility, and caused delamination in the durability test at low temperature (−20° C.), and damage to the resin in the flexural adhesiveness test. It is observed that Compared to the resin compositions of Examples, in Comparative Example 4, the cured product had a glass transition temperature of less than −50° C., and thus had reduced durability at high temperature, and delamination and deformation of the resin were observed in the durability test at 85° C. Unlike the resin composition of Examples, in Comparative Examples 5 and 6, the viscosity at 25° C. was out of the range of about 5 mPa·s to about 50 mPa·s, indicating that precise application on an inkjet printer fails. As an example, as in Comparative Example 5, in case that the viscosity was less than 5 mPa·s, defects were caused during pattern formation due to discharge defects, and in case that the viscosity was greater than 50 mPa·s, as in Comparative Example 6, thickness deviation was caused after discharging, indicating that uniform application fails. Compared to the resin compositions of Examples, Comparative Example 7 did not contain the (meth)acrylate (A), and thus had reduced adhesion to glass and polyethylene terephthalate, and had delamination in the flexural adhesiveness test. It is observed that Compared to the resin compositions of Examples, Comparative Example 8 contained the (meth)acrylate (A) in an amount of greater than 30 wt %, and thus had an increased glass transition temperature to cause the cured resin composition to lose flexibility, thereby having delamination in the durability test at low temperature (−20° C.), and damage to the resin in the flexural adhesiveness test.

Compared to the resin compositions of Examples, Comparative Example 9 contained the monofunctional (meth)acrylate (C) in an amount of less than 50 wt %, and thus had high viscosity to be hardly applied to an inkjet printer, and had reduced flexibility to cause damage to the resin in the flexural adhesiveness test. Compared to the resin compositions of Examples, Comparative Example 10 contained the urethane (meth)acrylate oligomer (D) in an amount of greater than 15 wt %, and thus had high viscosity to be hardly applied to an inkjet printer, and did not contain the (meth)acrylate (A), and thus had significantly reduced adhesion to glass and polyethylene terephthalate, and delamination in the flexural adhesiveness test. Compared to the resin compositions of Examples, Comparative Example 11 had high viscosity, resulting in thickness deviation in case that applied to an inkjet printer, and had a high glass transition temperature, resulting in low flexibility at low temperature, thereby causing delamination in the durability test at −20° C., and did not contain the polymer (B), resulting in reduced bendability, thereby causing damage to the resin in the flexural adhesiveness test. Compared to the resin compositions of Examples, Comparative Examples 12 to 15 included an oil gelling agent and formed a gel state to have a too high viscosity to measure viscosity to be applied to an inkjet printer, and contained the polymer (B) in an amount of greater than 5 wt % to have significantly reduced adhesion to glass and polyethylene terephthalate, and delamination in the flexural adhesiveness test. Comparative Example 16 contained an organic solvent in an amount of 2%, and thus had white turbidity after UV curing, and delamination in the durability test and the flexural adhesiveness test at high temperature. Comparative Examples 17 to 19 contained an organic solvent in an amount of 10%, and thus formed a gel state even after UV curing, resulting in poor curing, and was required to go through an additional drying process after curing. Delamination was caused in the high temperature and low temperature durability tests and flexural adhesiveness test.

The resin composition of an embodiment has a viscosity in a range of about 5 mPa·s to about 50 mPa·s before curing, indicating advantageous characteristics for forming a thin, uniform coating film, and may exhibit excellent coating properties even on uneven surfaces due to low viscosity characteristics. The adhesive member of an embodiment formed by curing the resin composition of an embodiment has a low glass transition temperature in a range of about −50° C. to about 0° C., and a high 180° peel strength of greater than about 1000 gf/25 mm for the polyethylene terephthalate film and glass. Accordingly, the display device of an embodiment may include an adhesive member formed through the resin composition of an embodiment to exhibit good reliability without delamination or lifting of the adhesive member in a curved portion, has excellent durability at low and high temperatures, and has no delamination between the adhesive member and adjacent members even in the act of bending or folding to exhibit excellent operational reliability.

The resin composition of an embodiment enables the formation of an adhesive member having high flexibility without using plasticizers and organic solvents, and does not require an additional process such as an organic solvent drying process, and thus process costs and time for an adhesive member formed by curing the resin composition and a display device including the same are reduced to increase productivity.

A resin composition of an embodiment has low viscosity properties, and may thus exhibit excellent coating properties for substrates of various shapes.

An adhesive member according to an embodiment may have a low glass transition temperature, have excellent adhesion properties to glass and polymer films, and exhibit excellent durability and stability at high and low temperatures.

A display device of an embodiment may include an adhesive member having high flexural adhesion, and may thus exhibit excellent reliability in various operation states.

Although the disclosure has been described with reference to embodiments of the disclosure, it will be understood that the disclosure should not be limited to these embodiments but various changes and modifications can be made by those skilled in the art without departing from the spirit and scope of the disclosure.

Accordingly, the technical scope of the disclosure is not intended to be limited to the contents set forth in the detailed description of the specification, and may also be defined by the appended claims.

What is claimed is:
1. A resin composition comprising:
a (meth)acrylate (A) comprising a hydroxy group and having a molecular weight of about 500 or less;
a polymer (B) comprising polyisoprene or polybutadiene as a main skeleton, having at least one radical reactive group in one molecule, and having a molecular weight in a range of about 2,000 to about 35,000;
a monofunctional (meth)acrylate (C) different from the (meth)acrylate (A); and
a urethane (meth)acrylate oligomer (D) having a molecular weight of about 6,000 or greater, wherein
the resin composition has a glass transition temperature in a range of about −50° C. to about 0° ° C. after the resin composition is cured,
the resin composition has a viscosity in a range of about 5 mPa·s to about 50 mPa·s at a temperature in a range of about 30° C. to about 50° C., and
with respect to a total amount of the resin composition, the resin composition comprises:
the (meth)acrylate (A) in an amount in a range of about 5 wt % to about 30 wt %;
the polymer (B) in an amount in a range of about 0.1 wt % to about 5 wt %;
the monofunctional (meth)acrylate (C) in an amount in a range of about 50 wt % to about 88 wt %; and
the urethane (meth)acrylate oligomer (D) in an amount in a range of about 1 wt % to about 15 wt %.

2. The resin composition of claim 1, wherein at least one of the (meth)acrylate (A), the polymer (B), and the monofunctional (meth)acrylate (C) has two or more types.

3. The resin composition of claim 1, wherein, the resin composition has a 180° peel strength of about 1000 gf/25 mm or greater for a polyethylene terephthalate (PET) film and glass, after the resin composition is cured.

4. The resin composition of claim 1, further comprising at least one radical polymerization initiator.

5. The resin composition of claim 1, further comprising an organic solvent,
wherein, the resin composition comprises the organic solvent in an amount of about 1 wt % or less with respect to a total amount of the resin composition.

6. An adhesive member comprising:
a polymer derived from a resin composition, the adhesive member having a glass transition temperature in a range of about −50° C. to about 0° C., wherein
the resin composition includes:
a (meth)acrylate (A) comprising a hydroxy group and having a molecular weight of about 500 or less;
a polymer (B) comprising polyisoprene or polybutadiene as a main skeleton, having at least one radical reactive group in one molecule, and having a molecular weight in a range of about 2,000 to about 35,000;
a monofunctional (meth)acrylate (C) different from the (meth)acrylate (A), and
a urethane (meth)acrylate oligomer (D) having a molecular weight of about 6,000 or greater
the resin composition has a viscosity in a range of about 5 mPa·s to about 50 mPa·s at a temperature in a range of about 20° C. to about 30° C., and
the resin composition comprises, with respect to a total amount of the resin composition:
the (meth)acrylate (A) in an amount in a range of about 5 wt % to about 30 wt %;
the polymer (B) in an amount in a range of about 0.1 wt % to about 5 wt %;

the monofunctional (meth)acrylate (C) in an amount in a range of about 50 wt % to about 88 wt %; and the urethane (meth)acrylate oligomer (D) in an amount in a range of about 1 wt % to about 15 wt %.

7. The adhesive member of claim 6, wherein the polymer is formed by photocuring the resin composition.

8. A display device comprising:
a display panel;
a window disposed on the display panel; and
an adhesive member disposed between the display panel and the window, wherein
the adhesive member has a glass transition temperature in a range of about −50° C. to about 0° C. and is derived from a resin composition,
the resin composition includes:
   a (meth)acrylate (A) comprising a hydroxy group and having a molecular weight of about 500 or less;
   a polymer (B) comprising polyisoprene or polybutadiene as a main skeleton, having at least one radical reactive group in one molecule, and having a molecular weight in a range of about 2,000 to about 35,000;
   a monofunctional (meth)acrylate (C) different from the (meth)acrylate (A); and
   a urethane (meth)acrylate oligomer (D) having a molecular weight of about 6,000 or greater,
the resin composition has a viscosity in a range of about 5 mPa·s to about 50 mPa·s at a temperature in a range of about 20° C. to about 30° C., and
the resin composition comprises, with respect to a total amount of the resin composition:
   the (meth)acrylate (A) in an amount in a range of about 5 wt % to about 30 wt %;
   the polymer (B) in an amount in a range of about 0.1 wt % to about 5 wt % the monofunctional (meth)acrylate (C) in an amount in a range of about 50 wt % to about 88 wt %; and the urethane (meth)acrylate oligomer (D) in an amount in a range of about 1 wt % to about 15 wt %.

9. The display device of claim 8, wherein the adhesive member has a thickness in a range of about 50 μm to about 200 μm.

10. The display device of claim 8, further comprising an input sensing unit disposed on the display panel,
   wherein the adhesive member is disposed between the display panel and the input sensing unit or disposed between the input sensing unit and the window.

11. The display device of claim 10, wherein
   the display panel comprises a display element layer and an encapsulation layer disposed on the display element layer;
   the input sensing unit is disposed on the encapsulation layer; and
   the adhesive member is disposed on the input sensing unit.

12. The display device of claim 8, wherein the adhesive member is formed by disposing the resin composition on a surface of the window or on a surface of the display panel, and UV curing the resin composition.

13. The display device of claim 8, further comprising at least one folding area, wherein the at least one folding area has a radius of curvature of about 5 mm or less.

14. The display device of claim 8, further comprising:
   a light control layer disposed between the adhesive member and the window; and
   an optical adhesive layer disposed between the light control layer and the window,
   wherein the optical adhesive layer includes a polymer derived from the resin composition.

* * * * *